US009290658B2

(12) United States Patent
Dorgan et al.

(10) Patent No.: US 9,290,658 B2
(45) Date of Patent: Mar. 22, 2016

(54) BLENDS OF BIORENEWABLE POLYAMIDES AND METHODS OF MAKING THE SAME

(71) Applicants: John R. Dorgan, Golden, CO (US); David A. Ruehle, Golden, CO (US)

(72) Inventors: John R. Dorgan, Golden, CO (US); David A. Ruehle, Golden, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 14/448,903

(22) Filed: Jul. 31, 2014

(65) Prior Publication Data

US 2015/0038652 A1     Feb. 5, 2015

Related U.S. Application Data

(60) Provisional application No. 61/860,348, filed on Jul. 31, 2013.

(51) Int. Cl.
*C08L 77/00* (2006.01)
*C08L 77/06* (2006.01)
*C08L 77/02* (2006.01)
*C08J 3/00* (2006.01)

(52) U.S. Cl.
CPC ............... *C08L 77/06* (2013.01); *C08J 3/005* (2013.01); *C08L 77/02* (2013.01); *C08J 2377/02* (2013.01); *C08J 2377/06* (2013.01)

(58) Field of Classification Search
None
See application file for complete search history.

(56) References Cited

U.S. PATENT DOCUMENTS 4,444,816 A * 4/1984 Richards et al. ............. 428/34.9

OTHER PUBLICATIONS

Adhikari et al., "Influence of molecular architecture on morphology and micromechanical behavior of styrene/butadiene block copolymer systems," Progress in Polymer Science, 2004, vol. 29(9), pp. 949-986, 1 page, abstract only.
Alfonso et al., "Kinetics of crystallization in semicrystalline/amorphous polymer mixtures," Macromolecules, 1986, vol. 19(4), pp. 1143-1152, 2 pages, abstract only.
Amass et al., "A review of biodegradable polymers: uses, current developments in the synthesis and characterization of biodegradable polyesters, blends of biodegradable polymers and recent advances in biodegradation studies," Polymer International, 1998, vol. 47(2), pp. 89-144, 2 pages, abstract only.
Auras et al., "An Overview of Polylactides as Packaging Materials," Macromolecular Bioscience, 2004, vol. 4(9), pp. 835-864, 2 pages, abstract only.
Bates, "Polymer-Polymer Phase Behavior," Science, 1991, vol. 251(4996), pp. 898-905, 1 page, abstract only.

Berghmans et al., "Crystallization and melting of the system isotactic polystyrene + poly(2,6-dimethyl phenylene oxide)," Journal of Polymer Science: Polymer Physics Edition, 1977, vol. 15(10), pp. 1757-1767, 2 pages, abstract only.
Bunn et al., "The Crystal Structures of Two Polyamides ('Nylons')," Proceedings of the Royal Society of London, Series A, Mathematical and Physical Sciences, 1947, pp. 39-68, 2 pages, abstract only.
Chandra et al., "Biodegradable Polymers," Progress in Polymer Science, 1998, vol. 23, pp. 1273-1335.
Cote et al., "Miscibility of Polyamide Blends. 2. Thermal Study of Poly(hexamethylene isophthalamide)/Nylon-n,m Blends," Macromolecules, 1994, vol. 27(25), pp. 7329-7338, 2 pages, abstract only.
Dasgupta, et al., "Crystal Structures and Properties of Nylon Polymers from Theory," Journal of the American Chemical Society, 1996, vol. 118(49), pp. 12291-12301.
Dorgan et al., "Kinetics of Spinodal Decomposition in Liquid Crystalline Polymers: Processing Effects on the Phase Separation Morphology," Macromolecules, 1998, vol. 31(1), pp. 193-200, 1 page, abstract only.
Dorgan, "Spinodal decomposition in mixtures containing nematogens. II. Kinetics of spinodal decomposition," Journal of Chemical Physics, 1993, vol. 98(11), pp. 9094-9106, abstract only.
Eastmond, "Poly(ε-caprolactone) Blends," Advances in Polymer Science, 1999, vol. 149, p. 165, 1 page, abstract only.
Eersels et al., "Influence of interchange reactions on the crystallization and melting behaviour of polyamide blends as affected by the processing conditions," Polymer, 1996, vol. 37, pp. 983-989, 1 page, abstract only.
Ellis, "Critical miscibility limits in blends of aliphatic polyamides containing an aromatic polyamide," Polymer, 1990, vol. 31(6), pp. 1058-1064, 2 pages, abstract only.
Ellis, "Estimating interactions in blends of polyamides, polyesters and polycarbonate using copolymers," Macromolecular Symposia, 1996, vol. 112, pp. 47-54, 2 pages, abstract only.
Ellis, "Influence of structure on phase behavior of polyamide blends," Macromolecules, 1991, vol. 24(13), pp. 3845-3852, 2 pages, abstract only.
Ellis, "Miscibility and immiscibility of polyamide blends," Macromolecules, 1989, vol. 22(s), pp. 742-754, 2 pages, abstract only.
Ellis, "Miscibility in blends of aliphatic polyamides and an aromatic polyamide, nylon 3Me6T," Polymer, 1988, vol. 29(11), pp. 2015-2026, 1 page, abstract only.
Ellis, "Miscibility of polymide blends: effects of configuration," Polymer, 1995, vol. 36(20), pp. 3919-3926, 1 page, abstract only.
Ellis, "Mixing relationships in aliphatic polyamide blends," Polymer, 1992, vol. 33(7), pp. 1469-1476, 2 pages, abstract only.
Feldman, "Polyblend Compatibilization," Journal of Macromolecular Science, Part A: Pure and Applied Chemistry, 2005, vol. 42A(5), pp. 587-605, 2 pages, abstract only.

(Continued)

*Primary Examiner* — Ana Woodward
(74) *Attorney, Agent, or Firm* — Sheridan Ross P.C.

(57) ABSTRACT

The invention discloses a method to produce a blended polymer by mixing polyamide 11 and polyamide 6, 10. The method may be utilize melt mixing or may utilize blended solutions. The invention also includes a blended polymer, wherein the blended polymer is produced from polyamide 11 and polyamide 6,10.

20 Claims, 21 Drawing Sheets

(56) References Cited

OTHER PUBLICATIONS

Gong et al., "Effect of composition dependent Flory interaction parameter X on polymer adsorption," 1989, vol. 22(1), pp. 71-78, 1 page, abstract only.
Gross et al., "Biodegradable Polymers for the Environment," Science, 2002, vol. 297(5582), pp. 803-807, 1 page, abstract only.
Hoffman et al., "Melting Process and the Equilibrium Melting Temperature of Polychlorotrifluoroethylene," Journal of Research, 1962, vol. 66A(1), pp. 13-28.
Ikada et al., "Biodegradable polyesters for medical and ecological applications," Macromolecular Rapid Communications, 2000, vol. 21(3), pp. 117-132.
Inoue, "Studies on crystallization of high polymers by differential thermal analysis," Journal of Polymer Science Part A: General Papers, 1963, vol. 1(8), pp. 2697-2709, 2 pages, abstract only.
Jo et al., "Equation of state theory for melting point depression in miscible polymer blends," Macromolecules, 1991, vol. 24(11), pp. 3368-3372, 2 pages, abstract only.
Karode et al., "Molecular weight distribution in interfacial polymerization-model development and verification," Chemical Engineering Science, 1997, vol. 52(19), pp. 3243-3255, 1 page, abstract only.
Karode et al., "New insights into kinetics and thermodynamics of interfacial polymerization," Chemical Engineering Science, 1998, vol. 53(15), pp. 2649-2663, 1 page, abstract only.
Keith et al., "Spherulitic Crystallization from the Melt. II. Influence of Fractionation and Impurity Segregation on the Kinetics of Crystallization," Journal of Applied Physics, 1964, vol. 35(4), pp. 1286-1296, 1 page, abstract only.
Koulouri et al., "Characterization of melt-mixed blends of poly(ether-ester) with various polyamides," Polymer, 1999, vol. 40(17), pp. 4887-4896, 1 page, abstract only.
Kuo, "Effect of copolymer compositions on the miscibility behavior and specific interactions of poly(styrene-co-vinyl phenol)/poly(vinyl phenyl ketone) blends," 2008, vol. 49(20), pp. 4420-4426.
Kuo, "Hydrogen-bonding in polymer blends," Journal of Polymer Research, 2008, vol. 15(6), pp. 459-486, 1 page, abstract only.
Liu et al., "Crystallization Kinetical and Morphological Peculiarities in Binary Crystalline/Crystalline Polymer Blends," Journal of Polymer Science Part B-Polymer Physics, 2007, vol. 45(15), pp. 1917-1931.
Marand et al., "Determination of the Equilibrium Melting Temperature of Polymer Crystals: Linear and Nonlinear Hoffman-Weeks Extrapolations," Macromolecules, 1998, vol. 31(23), pp. 8219-8229, 1 page, abstract only.
Marra et al., "In vitro analysis of biodegradable polymer blend/ hydroxyapatite composites for bone tissue engineering," Journal of Biomedical Materials Research, 1999, 47(3), pp. 324-335.
Martin et al, "Poly(lactic acid): plasticization and properties of biodegradable multiphase systems," Polymer, 2001, vol. 42(14), pp. 6209-6219, 1 page, abstract only.
Matkar et al., "Phase Diagrams of Binary Crystalline-Crystalline Polymer Blends," The Journal of Physical Chemistry B, 2006, vol. 110(32), pp. 16059-16065, 1 page, abstract only.
McMaster, "Aspects of Polymer-Polymer Thermodynamics," Macromolecules, 1973, vol. 6(5), pp. 760-773, 1 page, abstract only.
Nakai et al., "Process and Mechanism of Phase Separation in Polymer Mixtures with a Thermotropic Liquid Crystalline Copolyester as One Component," Macromolecules, 1996, vol. 29(18), pp. 4990-6001, 1 page, abstract only.
Nampoothiri et al., "An overview of the recent developments in polylactide (PLA) research," Bioresource Technology, 2010, vol. 101(22), pp. 8493-8501, 1 page, abstract only.
Nedoma et al., "Measurements of the Flory-Huggins Interaction Parameter Using a Series of Critical Binary Blends," Ind. Eng. Chem. Res., 2008, 47(10), pp. 3661-3553, 1 page, abstract only.
Nishi et al., "Melting Point Depression and Kinetic Effects of Cooling on Crystallization in Poly(vinylidene fluoride)-Poly(methyl methacrylate) Mixtures," Macromolecules, 1975, vol. 8(6), pp. 909-915.

Nishi et al., "Thermally Induced Phase Separation Behavior of Compatible Polymer Mixtures," Macromolecules, 1975, vol. 8(2), pp. 227-234, 2 pages, abstract only.
Nitz et al., "Influence of Lignin Type on the Mechanical Properties of Lignin Based Compounds," Macromolecular Materials and Engineering, 2001, vol. 286(12), pp. 737-743, 2 pages, abstract only.
Ogunniyi, "Castor oil: A vital industrial raw material," Bioresource Technology, 2006, vol. 97(9), pp. 1086-1091, 1 page, abstract only.
Ong et al, "Dynamic mechanical properties of some nylons and their blends," Journal of Applied Polymer Science, 1986, vol. 31(2), pp. 367-383, 2 pages, abstract only.
Painter et al., "Effect of hydrogen bonding on the melting point depression in polymer blends where one component crystallizes," Macromolecules, 1991, vol. 24(20), pp. 5623-5629, 2 pages, abstract only.
Painter et al., "Hydrogen bonding in polymer blends. 2. Theory," Macromolecules, 1988, vol. 21(1), pp. 66-72, 2 pages, abstract only.
Paul et al., "A binary interaction model for miscibility of copolymers in blends," Polymer, 1984, vol. 25(4), pp. 487-494, 2 pages, abstract only.
Puglisi et al., "Exchange Reactions Occurring through Active Chain Ends. MALDI-TOF Characterization of Copolymers from Nylon 6,6 and Nylon 6,10," Macromolecules, 2003, vol. 36(4), pp. 1098-1107, 1 page, abstract only.
Puskas et al., "Blends of poly(2,6-dimethyl-1,4-phenylene oxide)(PPO) with polystyrene-based thermoplastic rubbers: A comparative study," Polymer, 2007, vol. 48(2), pp. 590-597, 1 page, abstract only.
Rim et al., "Melting behavior of crystalline/compatible polymer blends: poly(iϵ-caprolactone)/polystyrene-co-acrylonitrile)," Macromolecules, 1983, vol. 16(15, pp. 762-768, 2 pages, abstract only.
Rim et al., "Melting Point Depression in Crystalline/Compatible Polymer Blends," Macromolecules, 1984, vol. 17(8), pp. 1520-1526, 2 pages, abstract only.
Runt, et al., "Polymer-polymer interaction parameters via melting point depression. A critical analysis," Polymer Communications, 1991, vol. 32(6), pp. 180-182, 1 page, abstract only.
Samir et al., "Review of Recent Research into Cellulosic Whiskers, Their Properties and Their Application in Nanocomposite Field," Macromolecules, 2005, vol. 6(2), pp. 612-626.
Scott, "The Thermodynamics of High Polymer Solutions. V. Phase Equilibria in the Ternary System: Polymer 1-Polymer2-Solvent," the Journal of Chemical Physics, 1949, vol. 17(3), pp. 279-284, 1 page, abstract only.
Sionkowska, "Current research on the blends of natural and synthetic polymers as new biomaterials: Review," Progress in Polymer Science, 2011, vol. 36(9), pp. 1254-1276, 1 page, abstract only.
Sudesh et al., "Synthesis, structure and properties of polyhydroxyalkanoates: biological polyesters," Progress in Polymer Science, 2000, vol. 25(10), pp. 1503-1555, 1 page, abstract only.
Takeda et al., "The effect of physical interactions on melt-phase homogenization of mixtures of poly(m-xylene adipamide) with aliphatic polyam ides induced by interchange reactions," Polymer, 1992, vol. 33(18), pp. 3899-3907, 2 pages, abstract only.
Takemori, "Towards an Understanding of the Heat Distortion Temperature of Thermoplastics," Polymer Engineering and Science, 1979, vol. 19(15), pp. 1104-1109, 4 pages.
Verma et al., "A study on blends of nylon-6 and nylon-66," Journal of Applied Polymer Science, 1986, vol. 31(3), pp. 747-762, 2 pages, abstract only.
Verma et al., "Morphological Changes during Secondary Crystallization and Subsequent Melting in Poly(ether ether ketone) as Studied by Real Time Small Angle X-ray Scattering," Macromolecules, 1996, vol. 29(24), pp. 7767-7775, 1 page, abstract only.
Verma et al., "SAXS studies of lamellar level morphological changes during crystallization and melting in PEEK," Polymer, 1996, vol. 37(24), pp. 5357-5365, 1 page, abstract only.
Wang et al., "Influence of preparation methods on the structures and properties for the blends between polyamide 6co6T and polyamide 6: Melt-mixing and in-situ blending," Journal of Polymer Science Part B-Polymer Physics, 2008, vol. 46(2), pp. 201-211, 2 pages, abstract only.

(56) References Cited

OTHER PUBLICATIONS

Wang et al., "Spherulitic Crystallization in Compatible Blends of Poly(vinylidene fluoride) and Poly(methyl methacrylate)," Macromolecules, 1977, vol. 10(2), pp. 421-425, 2 pages, abstract only.
Wei et al., "Partial miscibility in a nylon-6/nylon-66 blend coalesced from their common α-cyclodextrin inclusion complex," Journal of Polymer Science Part B: Polymer Physics, 2004, vol. 42(8), pp. 1369-1378, 2 pages, abstract only.
Wittamann et al., "Polymer-monomer binary mixtures. I. Eutectic and epitaxial crystallization in poly(ε-caprolactone)-trioxane mixtures," Journal of Polymer Science: Polymer Physics Education, 1977, vol. 15(6), pp. 1089-1100, 2 pages, abstract only.
Yeh et al., "Crystallization kinetics of isotactic polystyrene from isotactic-atactic polystyrene blends," Journal of Polymer Science Part A-2: Polymer Physics, 1972, vol. 10(7), pp. 1183-1191, 2 pages, abstract only.
Yu, "Polymer blends and composites from renewable resources," Progress in Polymer Science, 2006, vol. 31(6), pp. 575-602, 1 page, abstract only.
Zhang et al., "Determination of the thermodynamic polymer-polymer interaction parameter of miscible blends prepared from two crystalline polymers," Journal of Polymer Science Part B: Polymer Physics, 1987, 25(4), pp. 723-738, 2 pages, abstract only.
Zhang et al., "Influence of Annealing on Structure of Nylon 11," Macromolecules, 2000, vol. 33(16), pp. 5999-6005, 1 page, abstract only.
Zhang et al., "Miscibility of Nylon 66 and Nylon 48 blend evaluated by crystallization dynamics," Thermochimica Acta, 2004, vol. 416(1), pp. 79-85, 1 pages, abstract only.
Zhou et al., "Numerical simulation of phase separation coupled with crystallization," The Journal of Chemical Physics, 2008, vol. 129, pp. 154901-1-154901-8.

\* cited by examiner

BLENDS OF BIORENEWABLE POLYAMIDES AND METHODS OF MAKING THE SAME

CROSS REFERENCE TO RELATED APPLICATIONS

This application claims priority under 35 U.S.C. §119(e) to U.S. Provisional Patent Application Ser. No. 61/860,348 filed Jul. 31, 2013, which is incorporated herein in its entirety by reference.

GOVERNMENT INTEREST

This invention was made with government support under grant number CMMI-0700869 awarded by the National Science Foundation (NSF). The Government has certain rights in the invention.

FIELD OF THE INVENTION

The present invention relates to blends of polyamide 11 (PA-11) and polyamide 6, 10 (PA-610) and methods of making the same.

BACKGROUND

Market demand for biorenewable polymers is expected to increase by about 18% annually through the year 2018 with non-biodegradable bioplastics growing from around 8% to about 47% of the bioplastic market over the same period due to a range of applications for renewably based polymers and consumer desire for increased sustainability and energy independence.

Polyamides (PA), also known as Nylons, are an important class of engineering thermoplastics with a variety of applications. With the exception of PA-11, polyamides are typically derived from non-renewable fossil resources. However, the source of the polyamides is changing as more monomers become available from renewable resources. Blends of different types of Nylons are an established art, for example blends of aliphatic and aromatic polyamides find application in the automobile industry. Generally, the scientific and patent literatures suggest that aromatic-aliphatic blends are thermodynamically miscible but that aliphatic-aliphatic blends are usually immiscible.

Polymer blends are an established science but a number of rather fundamental issues remain. Polymers typically form immiscible blends. The large molecular weight of polymers limits the entropic contribution to free energy of mixing so that relatively small unfavorable enthalpy of mixing values lead to phase separation. Therefore, a large portion of polymer blending research is conducted on immiscible polymer systems—including the effects of compatibilization agents and blending techniques on the properties and morphology of immiscible blends.

Two examples of aliphatic polymers include PA-11 and PA-610. Desirable properties of PA-11 include high impact and abrasion resistance, low specific gravity (density of 1.03 g/cm$^3$), excellent chemical resistance, low water absorption, and high thermal stability (melting point between about 180-190° C.). Applications for PA-11 include oil and gas pipelines, hydraulic and pneumatic hoses, powder coatings, skis, snowboards and optical fiber sheathing.

PA-610 is also a high-performance, semi-crystalline polymer. Important properties of PA-610 include low water uptake, hydrolysis resistance, stress cracking resistance, resistance to fuels, oils, greases, most solvents, aqueous solutions and alkalis. PA-610 has excellent flexural stiffness, dimensional stability, heat deflection temperature and high thermal stability (a melting point near 220° C.).

A recent review on all known miscible crystalline/crystalline polymer blends was published by Liu, J. P.; Jungnickel, B. J. *Journal of Polymer Science Part B-Polymer Physics*, 2007, 45, (15), 1917-1931. This review discusses the few known miscible crystalline/crystalline polymer blends and notes the strange kinetic and structural phenomena. Crystallization induced phase separation has been treated theoretically based on derivatives of a theory originally proposed by Dorgan (Dorgan, J. R. *Journal of Chemical Physics*, 1993, 98, (11), 9094-9106 and Dorgan, J. R.; Yan, D. *Macromolecules* 1998, 31, (1), 193-200) for simultaneous phase separation and ordering in liquid crystalline polymer blends.

Other PA blend literature consists mainly of polyamide-6 or polyamide-6,6 blended with various additive polymers including styrene, polypropylene, ABS, or with rubber toughening additives. There are several papers considering aliphatic PAs blended with aromatic PAs, but limited number of publications on aliphatic only PA blends. It has been shown that miscible aliphatic nylon blends, are rare, but do exist. Some of these miscible blends are polyamide 4,8/polyamide 6,6 and polyamide 6,6/polyamide 6. There are some sources on the interchange reactions that occur between the polyamide end groups to form block co-polymer in-situ. The blending time required to form significant interchange reactions is upwards of 3 hours at temperatures of 300° C.

There is a need for a miscible polymer blend that can be used in a large variety of applications that are manufactured at low temperature and short durations.

SUMMARY

The invention relates to high-performance polymers blended of PA-11 and PA-610, and methods of making the same. These polyamide blended polymers are suited for use in durable goods. PAs are commonly used in fabrics, carpeting, and other durable goods applications including: train cars, radiator tanks, and the battery bracket in electric cars. Additionally, 100% biorenewable PA-100 may be combined with partially renewable PA-610 to create a family of materials having different renewable carbon content and a suite of high performance properties. The resulting blended polymer may have a renewable carbon content between about 63% to about 100%. Additionally, the blended polymer exhibits the phenomena of crystallization induced phase separation.

An aspect of the invention is a thermodynamically miscible, biorenewable polyamide blend with varying renewable carbon content, comprising polyamide 11 and polyamide 6, 10.

An aspect of the invention is a method of solution blending a blended polymer, comprising mixing polyamide 11 and polyamide 6, 10 with a stabilizing agent to prepare a polymer solution, and drying the polymer solution to produce a blended polymer.

An aspect of the invention is a method for producing a blended polyamide material, comprising melting a polyamide 6, 10 to produce a melted polyamide 6, 10, adding a polyamide 11 to the melted polyamide 6, 10 to produce a polyamide mixture, adding at least one stabilization agent to the polyamide mixture to produce a stabilized polyamide mixture, and evaporating the at least one stabilization agent to produce a blended polyamide.

DETAILED DESCRIPTION

Figure 1:
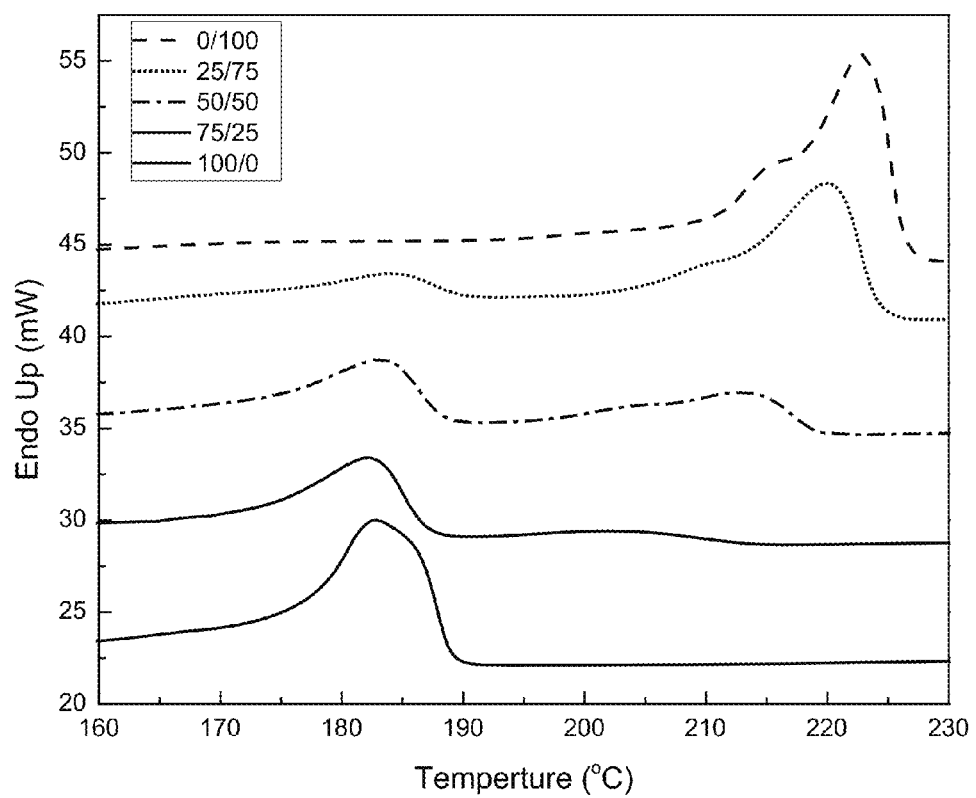
FIG. 1 illustrates differential scanning calorimetry (DSC) scans illustrating melting peaks of samples.

The invention relates to a polyamide blend comprising PA-11 and PA-610, and methods of making the same.

One aspect of the invention is a method for producing a blended polyamide material. The method includes melting a PA-610 to produce a melted PA-610, adding PA-11 to the melted PA-610 to produce a polyamide mixture, adding at least one stabilization agent to the polyamide mixture to produce a stabilized polyamide mixture, and evaporating the at least one stabilization agent to produce a blended polyamide.

In some embodiments, the blended polyamide comprises between about 1 wt % to about 75 wt % of the PA-610. In some embodiments, the blended polymer comprises about 1 wt %, about 10 wt %, about 20 wt %, about 25 wt %, about 40 wt %, about 50 wt %, about 60 wt %, or about 75 wt % of the PA-610. In some embodiments, the PA-610 may be at least partially renewable. In some embodiments, the PA-610 may be at least partially derived from castor oil.

In some embodiments, the blended polyamide comprises between about 35 wt % to about 99 wt % of PA-11. In some embodiments, the blended polymer comprises about 1 wt %, about 10 wt %, about 20 wt %, about 25 wt %, about 40 wt %, about 50 wt %, about 60 wt %, about 75 wt %, about 80 wt %, about 90 wt %, about 95 wt %, or about 99 wt % of the PA-11. In some embodiments, the PA-11 may be at least partially renewable, while in some embodiments, the PA-11 may be about 100% biorenewable. In some embodiments, the PA-11 may be at least partially derived from castor oil.

The method includes at least one stabilization agent. Suitable stabilization agents include, but are not limited to toluene and m-cresol and combinations thereof. Between about 0.1 wt % and about 0.40 wt % of the at least one stabilization agent is used in the mixture.

The PA-610 and PA-11 are melted at a temperature between about 200° C. and about 300° C., in some embodiments at about 220° C. The mixed PA-610 and PA-11 is melted for between about 5 minutes and about one hour, in some embodiments about 10 minutes. One skilled in the art would understand that the melting time may depend upon the amount of material in the mixture.

In some embodiments, the method may also include pre-processing of the PA-610, the PA-11, or both material before the materials are mixed. The pre-processing step may include vacuum drying the material at a pressure between about 1 psi to about 15 psi, in some embodiments about 11.3 psi. The vacuum temperature may be between about 60° C. to about 100° C., in some embodiments about 80° C. The vacuum drying may occur for any suitable duration. In some embodiments, the vacuum drying occurs for between about 1 hour to about 40 hours, in some embodiments about 20 hours.

Following the formation of the blended polymer, it may be post-processed. Post processing may include multiple steps. For example, post processing may include a vacuum drying procedure. The vacuum drying the material at a pressure between about 1 psi to about 15 psi, in some embodiments about 11.3 psi. The vacuum temperature may be between about 60° C. to about 100° C., in some embodiments about 80° C. The vacuum drying may occur for any suitable duration. In some embodiments, the vacuum drying occurs for between about 1 hour to about 40 hours, in some embodiments about 20 hours.

The post processing may also include an annealing step. Annealing may occur in a single step or in multiple annealing steps. The annealing temperature may be between about 150° C. to about 200° C., in some embodiments about 167° C., and in other embodiments about 181° C. The blended polymer may be held at the annealing temperature for between about 10 minutes to about 2 hours.

In other embodiments, the post processing may include cooling the blended polymer to room temperature. The post processing may include communiting the blended polymer using any suitable method, including but not limited to cutting, chopping, grinding, crushing, milling, micronizing and triturating. The comminuted blended polymer may be formed into pellets of any shape or size. In some embodiments, the pellets may have a diameter of between about 1 mm to about 5 mm.

Another aspect of the invention is a method of forming a blended polymer by solution blending. The method comprises mixing PA-11 and PA-610 with a stabilizing agent to provide an overall solution. The mixing temperature may be about room temperature in some embodiments, and the mixing time may be between about 6-7 days in some embodiments.

An advantage of the invention is that the blended polyamide is thermodynamically miscible. Other advantages include, that the blended polymers exhibits the phenomena of crystallization induced phase separation.

Another aspect of the invention is a thermodynamically miscible polyamide blend. The polyamide blend comprises PA-11 and PA-610.

The polyamide blend may have mechanical and thermal properties depending upon the quantity of the PA-11 and the PA-610 in the blended polymer. The blended polyamide may have a storage moduli between about 1.0 GPA and about 4 GPA. The impact strength of the blended polymer may be between about 30 J/m to about 80 J/m.

EXAMPLES

Thermal and mechanical properties of homogenous samples of PA-11 and PA-610, and three blends of mixtures of the blended polymer and/or the solution polymer were prepared using the methods discussed herein, were evaluated. Sample 1 comprises 0/100 wt % of PA-11/PA-610 (hereinafter 0/100 or PA-610). Sample 2 comprises a mixture of 25/75 wt % of PA-11/PA-610 (hereinafter 25/75). Sample 3 comprises a mixture of 50/50 wt % of PA-11/PA-610 (hereinafter 50/50). Sample 4 comprises a mixture of 75/25 wt % of PA-11/PA-610 (hereinafter 75/25). Sample 5 comprises 100/0 wt % of PA-11/PA-610 (hereinafter 100/0 or PA-11). The blends are intermediate contents between the two homopolymers, expanding the application portfolio of renewably derived polymers. The Examples includes several Tables. The each value in the Tables is approximate.

Unless otherwise indicated, the samples were not the solution blended polymer.

Thermal Properties
Procedures

Thermal properties were investigated using a PerkinElmer DSC-7 instrument, calibrated against an Indium standard. Aluminum pans were used to seal samples with masses ranging from about 10-20 mg. The DSC protocol used to find the observed melting point ($T_m$), glass transition temperature ($T_g$), and the maximum crystallinity temperature ($T_{c,max}$) was: 1) hold at about 5° C. for about 5 minutes; 2) heat from about 5° C. to about 260° C. at about 10° C./min.; 3) hold at about 260° C. for about 5 min.; 4) cool from about 260° C. to about 5° C. at about 10° C./min.; 5) hold at about 5° C. for about 5 min.; and 6) heat from about 5° C. to about 260° C. at about 10° C./min. The $T_{c,max}$ was taken from the cooling run (step 4). The $T_g$, $T_m$, and crystallinity were recorded from the second heating (step 6). The midpoint of the heat capacity change was used to calculate $T_g$'s.

The DSC protocol for creating the Hoffman-Weeks plot was: 1) hold at about 5° C. for about 5 minutes; 2) heat from about 5° C. to about 260° C. at about 10° C./min.; 3) hold at about 260° C. for about 5 min.; 4) cool from about 260° C. to a temperature in the range about 170-195° C. at about 200° C./min.; 5) hold at that temperature for about 30 min.; 6) cool from the crystallization temperature to about 5° C. at about 200° C./min.; and 7) heat from about 5° C. to about 260° C. at about 10° C./min. The melting temperature was taken from the second heat (step 7).

The DSC protocol for finding maximum crystallinity was: 1) hold at about 5° C. for about 5 minutes; 2) heat from about 5° C. to about 260° C. at about 10° C./min.; 3) hold at about 260° C. for about 5 min.; 4) cool from about 260° C. to the crystallization temperature at about 200° C./min.; 5) perform hold sequences of different temperatures and their combinations, 6) cool from the crystallization temperature to about 5° C. at about 200° C./min.; and 7) heat from about 5° C. to about 260° C. at about 10° C./min. The hold sequences used were for PA-11 at about 163° C., PA-610 at about 195° C., the 50/50 blend at about 181° C., at about 163° C., or about 181° C. then about 163° C. All data was collected on the second heat (step 7).

Results

Thermal properties of the samples were comprehensively investigated and show miscibility of the polymer blend. As illustrated in FIG. 1, the melting point depression of about 185° C. is observed. The depression indicates blend miscibility.

Polyamides crystallize quickly and during isothermal crystallization of blends in the DSC little to no crystallization peak during the hold step was observed. Therefore the calculations for the polymer-polymer interaction parameter were carried out using the observed melting temperatures as equilibrium temperatures. The observed melting temperatures from Table 1 were equal to or higher than the isothermal crystallization sample for all blends, allowing this assumption to be used with some confidence. The results of the calculations are shown in Table 3. The negative polymer-polymer interaction parameters calculated for the blends are all less than zero indicating miscibility and favorable enthalpy from mixing.

TABLE 1

| PA-11/PA-610 wt % | PA-11 Melting Temperature ° C. | PA-610 Melting Temperature ° C. | PA-610 Solution Blended Melting Temperature ° C. |
| --- | --- | --- | --- |
| 100/0 | 189 ± 0.6 | | |
| 75/25 | 186 ± 0.4 | 210 ± 2.1 | 220.5 ± 0.2 |
| 50/50 | 189 ± 1.1 | 220 ± 1.4 | 227.5 ± 0.2 |
| 25/75 | 189 ± 0.6 | 223 ± 0.8 | 229.5 ± 0.1 |
| 0/100 | | 226 ± 0.6 | 229.9 ± 0.1 |

Figure 2:
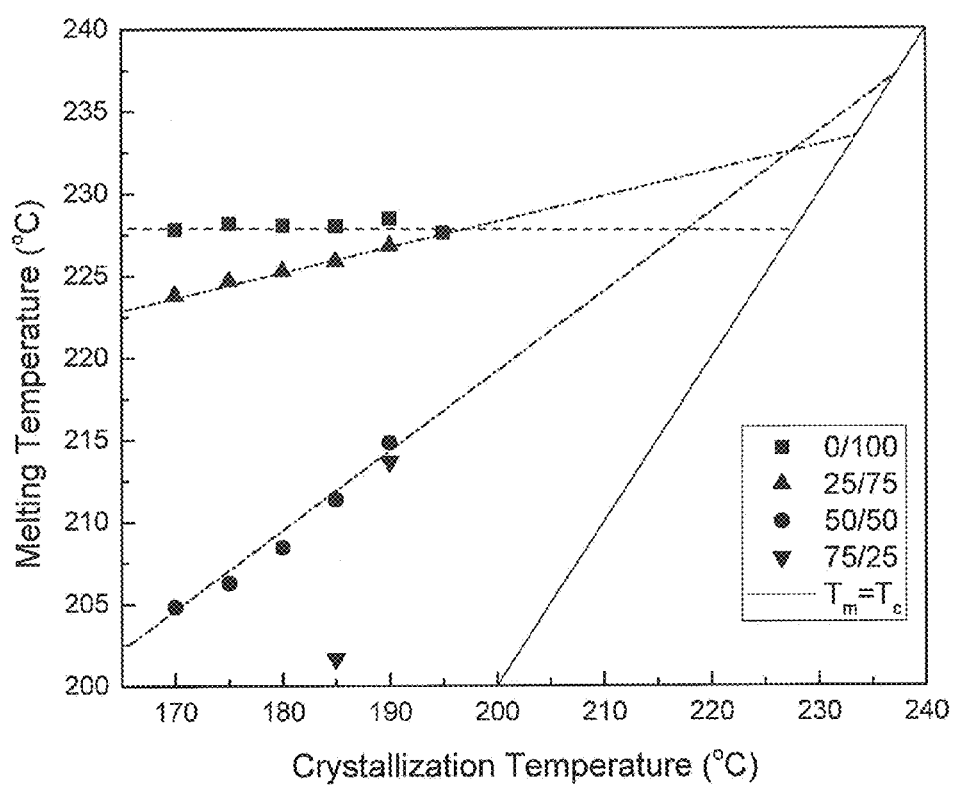
FIG. 2 illustrates Hoffman-Weeks plots for different samples.

The Hoffman-Weeks plot is illustrated in FIG. 2. In the derivation by Hoffman and Weeks Equation 1 is established.

$$(T_m^0 - T_m) = \phi(R_m^0 - T_c) \quad (1)$$

In Equation 1, $T_c$ is the crystallization temperature of isothermal annealing and $\phi$ is a stability parameter that depends heavily on the crystal thickness, where $\phi=0$ is the most stable crystal (i.e. $T_m = T_m^0$) and $\phi=1$ is unstable (i.e $T_m = T_c$). The calculated equilibrium melting temperatures and the stability parameter, $\phi$, for the blends and homopolymer can be found in Table 2.

TABLE 2

| PA-11/PA-610 wt % | Equilibrium Melting Temperature ° C. | Stability Parameter ($\phi$) |
| --- | --- | --- |
| 0/100 | 228 ± 6.6 | 0.00 ± 0.016 |
| 25/75 | 233 ± 3.4 | 0.14 ± 0.007 |
| 50/50 | 238 ± 43.1 | 0.50 ± 0.047 |
| 75/25 | — | 2.4 |

Table 2 illustrates that the stability parameter increases with increasing PA-610 content, rendering the Hoffman-Weeks approach unsuitable for finding the equilibrium melting temperature in the present system. Without wishing to be bound by theory, it is believed that there is a dependence of measured melting temperature on the rate of heating in the DSC.

The calculated polymer-polymer interaction parameters of PA-11 and PA-610 from solutions blended samples are shown in Table 3. All samples show miscibility for all compositions.

TABLE 3

| PA-11/PA-610 (wt %) | Equilibrium Melting Temperature (° C.) | $\phi_{PA-610}$ | $\chi_{12}$ |
|---|---|---|---|
| 0/100 | 226 | 1.00 | 0.00 |
| 25/75 | 223 | 0.74 | −0.10 |
| 50/50 | 220 | 0.49 | −0.17 |
| 75/25 | 210 | 0.24 | −0.31 |

Figure 3:
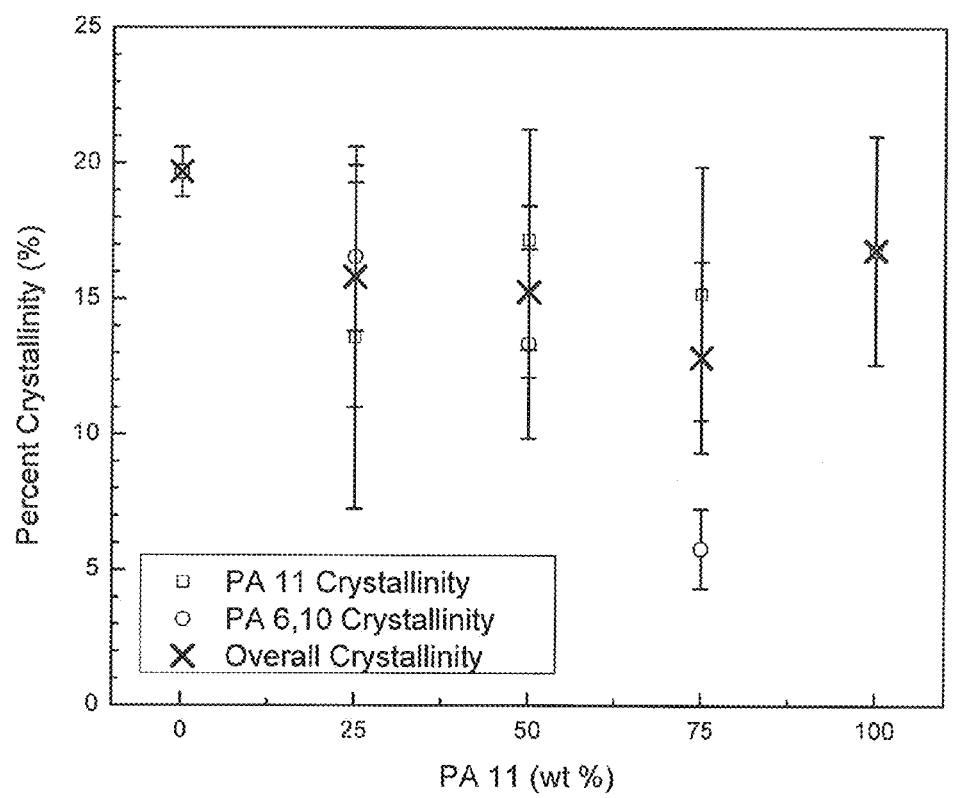
FIG. 3 illustrates the percent crystallinity of samples upon second heating in the DSC.

The DSC was used to find the glass transition temperature ($T_g$), un-annealed crystallinity, and the maximum crystallization temperature ($T_{c,max}$) of the blends and homopolymers. All values were determined using the data from the second heating scan to avoid artifacts associated with the initial heating. The glass transition temperature for varying compositions is illustrated in Table 4 and FIG. 3. In FIG. 3, open squares represent the percent by volume of the PA-11 that is in the crystalline state, open circles represent PA-610, and Xs represents the overall percent crystallinity of the blend.

TABLE 4

| Blend Composition wt % | $T_g$ ° C. | PA-11 Crystallinity % | PA-11 Maximum Crystallization Temp. ° C. | PA-610 Crystallinity % | PA-610 Maximum Crystallization Temp. ° C. |
|---|---|---|---|---|---|
| 100/0 | 34.9 ± 0.6 | 16.8 ± 4.2 | 163 ± 0.3 | — | — |
| 75/25 | 32.1 ± 0.4 | 15.2 ± 4.7 | 161 ± 0.6 | 5.8 ± 1.5 | — |
| 50/50 | — | 17.2 ± 4.1 | 166 ± 0.9 | 13.3 ± 3.5 | 180 ± 2.1 |
| 25/75 | — | 13.6 ± 6.3 | 175 ± 14.2 | 16.6 ± 2.7 | 188 ± 0.7 |
| 0/100 | 38.2 ± 0.4 | — | — | 19.7 ± 0.9 | 195 ± 0.6 |

Solubility parameter values derived from two different group contribution methods are presented in Table 5.

TABLE 5

| Method | Sample | $\Delta t$ (Total Interaction Parameter) | $\Delta p$ (Polar Contribution Interaction Parameter) | $\delta h$ (Hydrogen Bonding Contribution Interaction Parameter) | $\Delta d$ (Dispersive Contribution Interaction Parameter) |
|---|---|---|---|---|---|
| Hoftyzer's Method | PA-11 | 17.99 | 4.23 | 5.20 | 16.69 |
| Hoftyzer's Method | PA-610 | 18.27 | 4.04 | 6.04 | 16.76 |
| Hoy's Method | PA-11 | 21.67 | 9.58 | 7.92 | 17.75 |
| Hoy's Method | PA-610 | 22.13 | 9.46 | 9.16 | 17.79 |

The glass transition temperature varies slightly in the blends with only one $T_g$ being observed. This was true for all samples indicating miscibility. However, the $T_g$ values for the homopolymers are quite close—PA-11 is 34.9° C. and PA-610 is 38.2° C. The thermal signals are also weak making it difficult to evaluate even in the pure state. Accordingly, no definitive statement can be made about the miscibility based on DSC determination of the glass transition temperatures.

The data illustrated in FIG. 3 suggest the blend exhibits the phenomena of crystallization induced phase separation. The crystallization endotherm peak during the cooling scan is used to determine the maximum crystallization temperature. The 75/25 blend does not have an observable $T_{c,max}$ for the PA610 component because crystallization does not occur upon cooling at normal rates. However, for high molecular weight polymers the rate of crystallization from the melt state is fast compared to the time scale for phase separation (crystallization is a local chain folding and stacking process whereas phase separation requires diffusion over distances of the order of the end-to-end vector; the timescale is at least the repetition time in the melt). The lack of a crystallization peak during cooling means the PA-610 cannot crystallize because it is not in a pure state. That is, the thermodynamic driving force for phase separation is the formation of the stable, low energy crystalline state but the kinetics are governed by the slow diffusion processes of chains diffusing from a well-mixed amorphous state to the growing crystals. If the polymers were phase separated, the PA-610 domains would still crystallize. Instead, an annealing step was performed. Percent crystallinity is reported in Table 4 on a per polymer basis (i.e. crystalline polymer$_i$/total polymer$_i$).

Annealing studies were performed to find maximum crystallinity of the 50/50 blend and the homopolymers by holding the samples at the two maximum crystallization temperatures of about 162° C. ($T_{c,max}$ of PA-11) and about 185° C. ($T_{c,max}$ of PA-610 in the 50/50 blend). Table 6 shows that the overall crystallinity is maximized for the sample that is annealed at both $T_{c,max}$ temperatures.

TABLE 6

| Annealing Temperature | | Overall % Crystallinity |
|---|---|---|
| 167° C. | | 26.5% |
| 167° C. | 181° C. | 26.8% |
| | 181° C. | 22.6% |

However, the difference is small compared to annealing only at the lower temperature. Once determined, the annealing sequence that returns the maximum crystallinity was applied as the pretreatment prior to mechanical testing.

Figure 4:
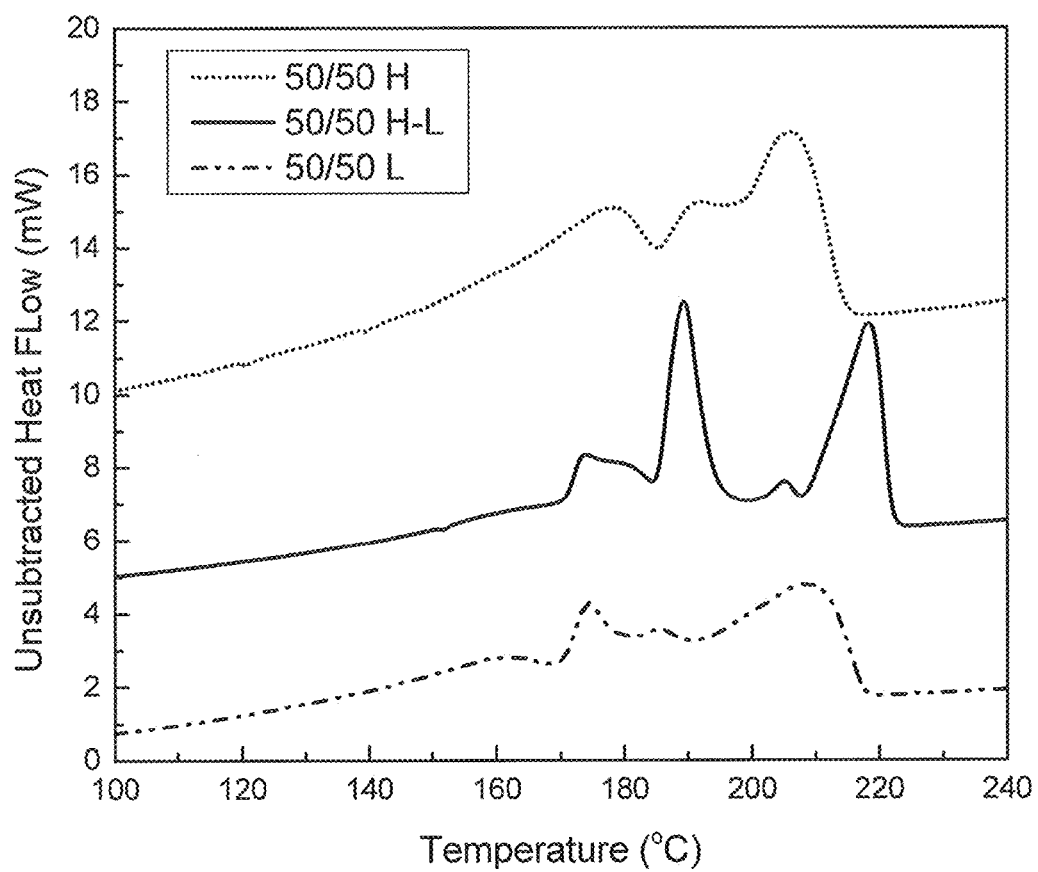
FIG. 4 illustrates melt peaks of the 50/50 blend sample using different annealing protocols.

FIG. 4 illustrates the complex melting peaks for the blends annealed under different conditions. The observed behavior is complex making analysis difficult. The annealing temperature for 50/50 H was 181° C., the annealing temperatures for a high-low (HL) was first anneal at about 181° C. for 30 minutes, followed by annealing at 167° C. for 30 minutes. The annealing temperature for 50/50 L was 167° C.

The two melting peaks are most clearly separated in the case of annealing at the high temperature first followed by the lower temperature.

Figure 5:
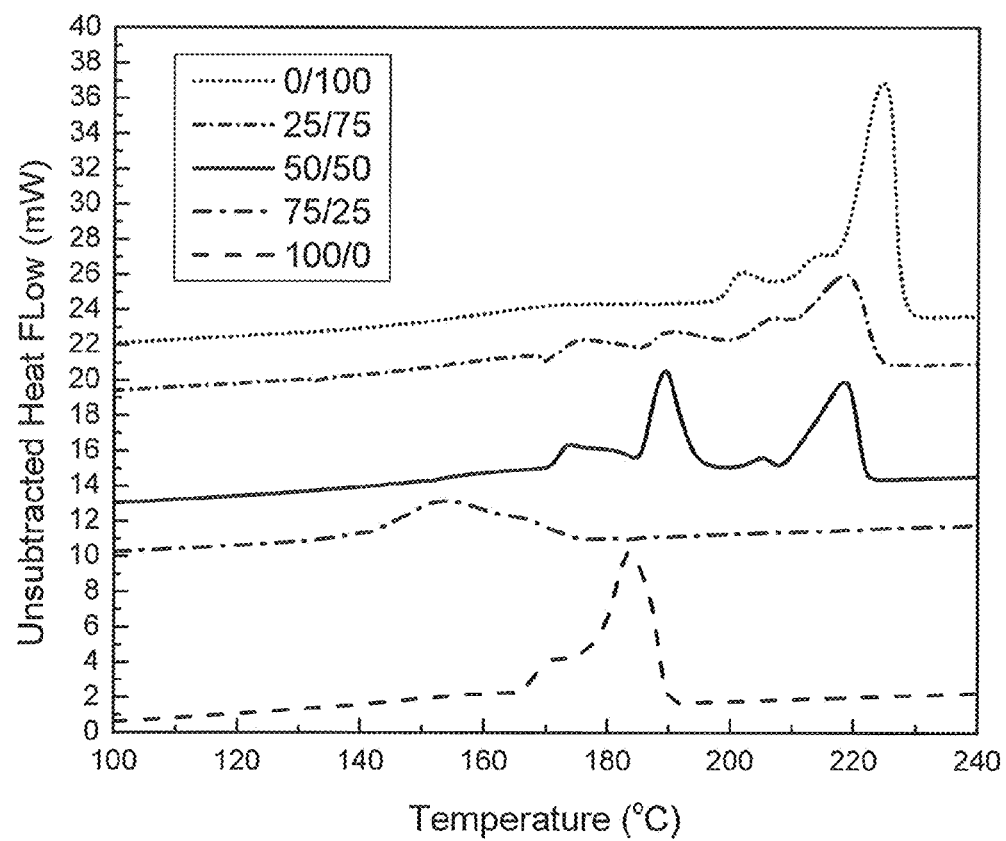
FIG. 5 illustrates melt peaks for multiple blend samples using a high-low annealing procedure.

The HL annealing procedure was applied to all samples and DSC was used to determine the overall percent crystallinity present during mechanical testing. FIG. 5 and Table 7 illustrate the results.

TABLE 7

| Composition | Annealing Temperature | | Overall % Crystallinity |
|---|---|---|---|
| 100/0 | 163° C. | | 18.0% |
| 75/25 | 167° C. | 181° C. | 7.8% |
| 50/50 | 167° C. | 181° C. | 26.8% |
| 25/75 | 167° C. | 181° C. | 27.5% |
| 0/100 | | 195° C. | 26.5% |

The 25/75 and 75/25 blends both show single but broad melting peaks each of which is depressed relative to the homopolymer constituting the majority component. These peaks are further evidence that the polymer system is miscible in the amorphous region and of a eutectic system. If the polymers were immiscible in the melt state there would be a PA-11 rich phase and a PA-610 rich phase. Upon cooling it would be likely that each of the phases could produce semi-crystalline domains.

Changes due to the annealing sequence are significant. All blends except the PA-11 sample changed by greater than a factor of 35% when compared to the crystallinity of a sample without isothermal annealing. Crystallinity for PA-11 increases from about 16.8% to about 18.0%. The overall crystallinity of the blends changed from about 12.8% to about 7.8%, about 15.3% to about 26.8%, and about 15.8% to about 27.5% for the 75/25, 50/50, and 25/75 blends, respectively. The PA-610 crystallinity changed from about 19.7% to about 26.5%. The decrease in crystallinity for the 75/25 is explained by the lack of any higher $T_m$ melting peak, which affects the mechanical properties.

Thermo-Mechanical Properties
Procedures

The blends thermal stability was characterized by thermal gravimetric analysis (TGA) using a Seiko TG/DTA 220 instrument. Samples of about 15-25 mg of the blends were placed in an alumina pan and heated in an air environment from about 40° C. to about 800° C. at a ramp rate of about 10° C./min. The onset degradation temperature is calculated as the temperature at the intersection of a straight line from the weight vs. temperature data before decomposition started and a second straight line fit to the decomposition step.

Dynamic mechanical thermal analysis (DMTA) was carried out in an ARES-LS rheometer with torsional rectangular fixtures and used to find the shear modulus as a function of temperature. Testing was carried out at about 0.05% strain and a frequency of about 1 Hz at temperatures from about −10° C. to about 180° C. at ramp rate of about 5° C./min. The instrument was calibrated for normal force and torque before tests were performed. Glass transition temperature associated α-transition and heat distortion temperature (HDT) were also found from DMTA data.

Impact properties of the polymer blends were measured according to ASTM D256 for notched Izod impact testing. ASTM D4066 was followed in the preparation of the nylon bars. The bars were not thermally treated before the test was performed. Impact testing bars (dimensions about 12.7 mm by about 63.5 mm by about 3.2 mm) from the Morgan Press were set on a plate for about 24 hours after injection molding to control free volume relaxation and provide for amorphous phase densification. The bars were then notched using a manual RJW LTD Charpy notch instrument with a type H "V" broach. A minimum of 5 samples were conducted for every composition on a TMI electronic Izod impact tester with a 5 ft-lb swing arm to measure the impact strength after an average of three thicknesses were measured near the notch. Error cited is one standard deviation.

Results

Figure 6:
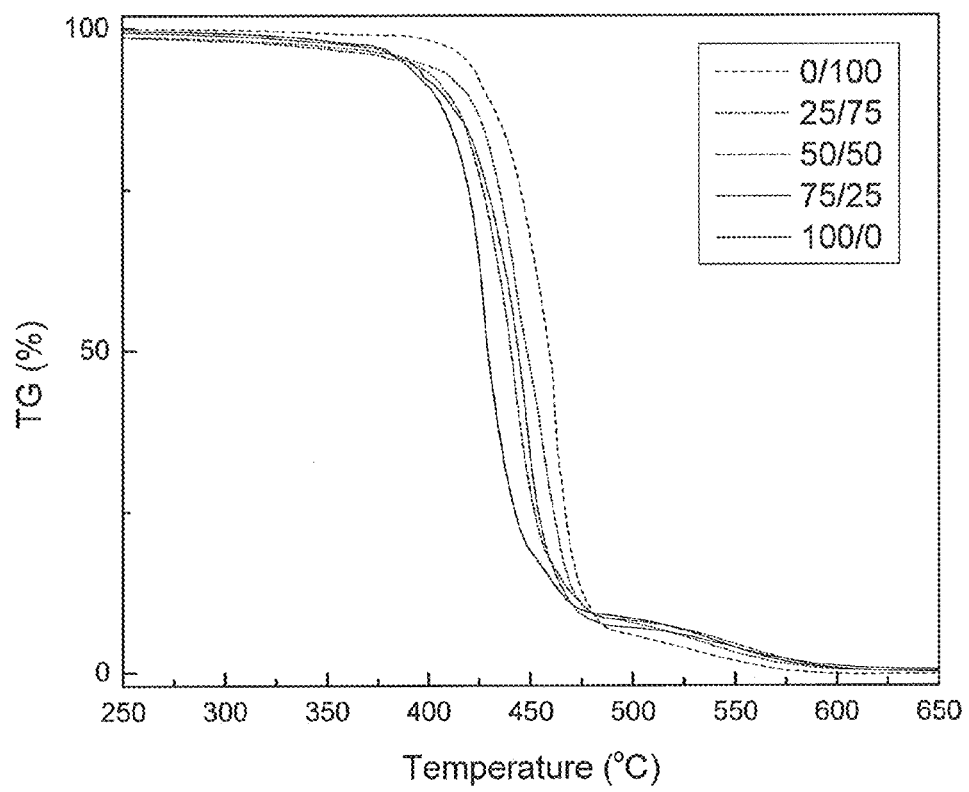
FIG. 6 illustrates TG data for multiple blend samples under an air atmosphere.

TGA was used to find the onset degradation temperature of the homopolymers and blends. FIG. 6 illustrates that PA-11 has the lowest onset degradation temperature at about 419° C. and PA-610 has the highest at about 437° C. Onset degradation temperate for the blends have a monotonic change between the two homopolymers at about 424° C., about 426° C., and about 431° C. for the 75/25, 50/50, 25/75 blends, respectively. This data shows that at the maximum temperature of about 260° C. used in the DSC experiments and at the lower temperature used for thermal annealing of sample bars, there is unlikely to be significant thermal degradation.

Figure 7:
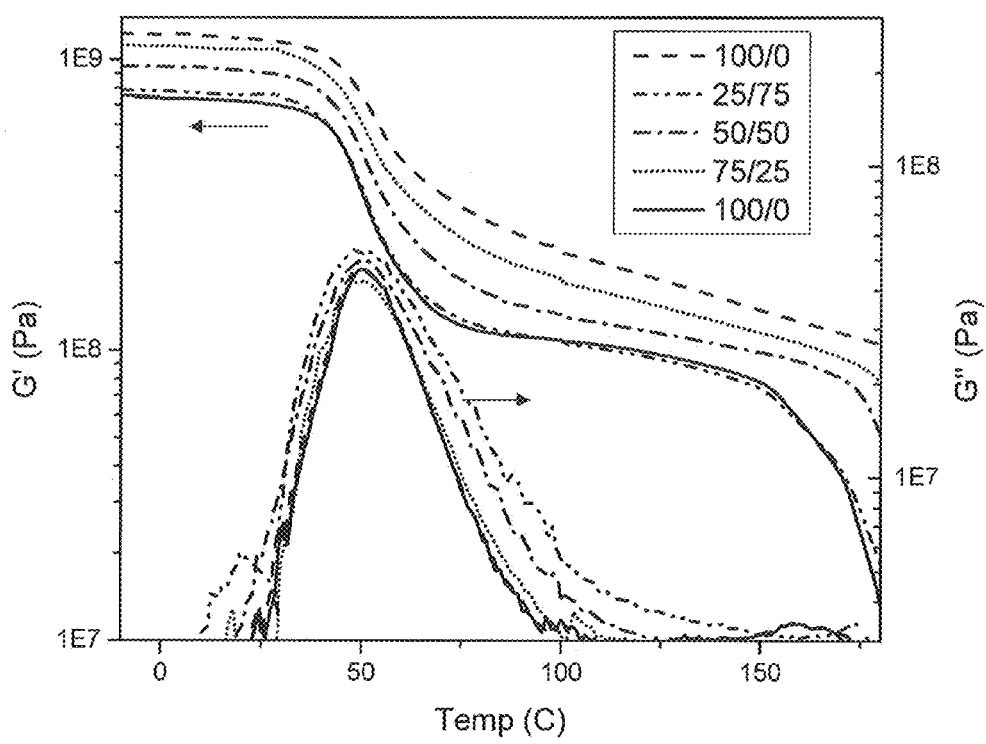
FIG. 7 illustrates the storage modulus (G') and Loss modulus (G") for multiple blend samples over a temperature of −10° C. to about 200° C.

DMTA is used to characterize the blends mechanical properties by measuring the storage (G') and loss (G") moduli at fixed frequency as a function of temperature as illustrated in FIG. 7. Room temperature tests over longer sampling times were performed to find accurate storage and loss moduli reported in Table 8.

TABLE 8

| Composition PA11/ PA610 | G' | | | G" | | |
|---|---|---|---|---|---|---|
| | Room Temp. GPa | Temp. Sweep GPa | Percent Difference % | Room Temp. MPa | Temp. Sweep MPa | Percent Difference % |
| 100/0 | 0.828 | 0.642 | −22 | 1.8 | 7.1 | 304 |
| 75/25 | 0.847 | 0.806 | −5 | 3.9 | 8.6 | 118 |
| 50/50 | 0.974 | 0.884 | −9 | 6.8 | 9.4 | 38 |
| 25/75 | 1.042 | 0.722 | −31 | 2.0 | 5.3 | 162 |
| 0/100 | 1.173 | 0.906 | −23 | 5.0 | 8.9 | 78 |

Table 8 shows the storage modulus changes monotonically between the homopolymers. At room temperature PA-11 has a storage modulus of about 0.828 GPa and PA-610 has a storage modulus of about 1.173 GPa. The blends have a storage modulus of about 0.847 GPa, about 0.974 GPa, and about 1.042 GPa for the 75/25, 50/50, and 25/75 blends, respectively.

DMTA is also used to characterize the blends thermal properties (HDT and α-relaxation) from the storage modulus and loss tangent as a function of temperature. The heat distortion temperature (HDT) is the temperature at which a sample bar deflects 0.25 mm during a bending under load test described according to ASTM method D648. Takemori (*Polymer Engineering & Science* 19, 1104-1109 (1979)) has established a correlation between the HDT and the temperature at which the shear modulus is equal to about 0.28 GPa. Using the Takemori method, the HDT was about 52±0.6° C. and about 76±6.7° C. for PA-11 and PA-610 respectively. The HDT of the blends were about 57±15° C., about 60±8.9° C., and about 54±1.4° C. for the 75/25, 50/50, and 25/75 blend, respectively. The HDT temperature for an amorphous polymer should be near the $T_g$, however, for semi-crystalline polymers, the HDT is somewhere between the $T_g$ and $T_m$.

Figure 8:
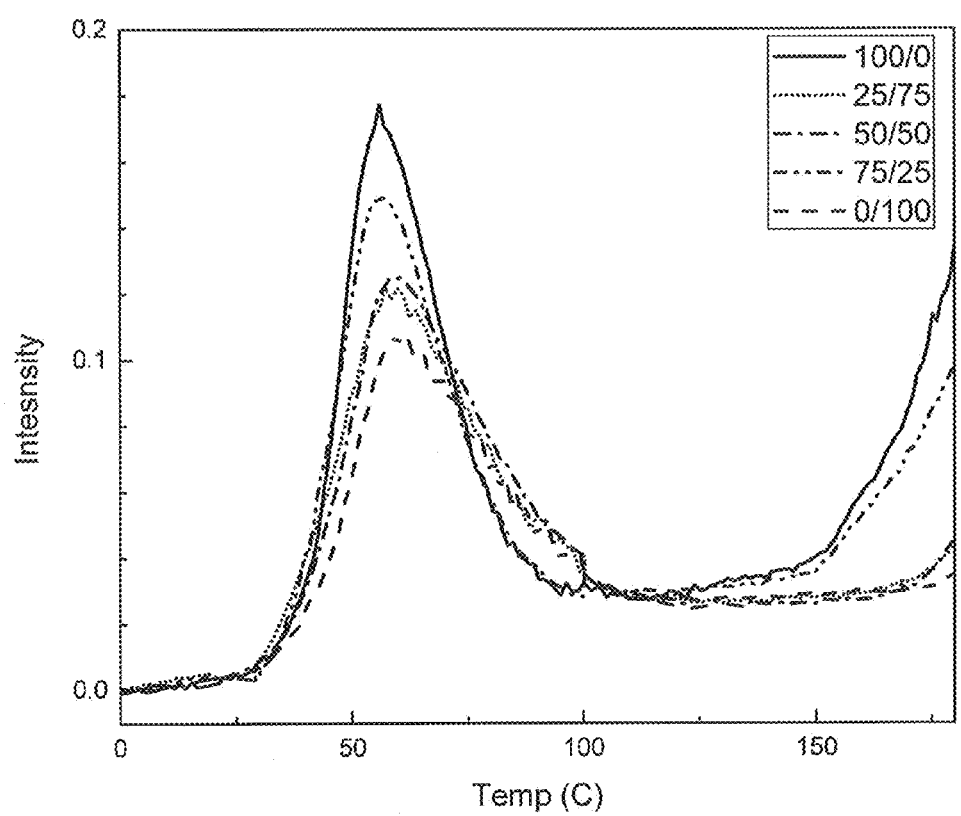
FIG. 8 illustrates the loss tangent for multiple blend samples as a function of temperature.

The loss tangent (tan(δ)=G"/G') was used to find the α-relaxation associated with the $T_g$. The loss tangent for multiple blend samples is illustrated in FIG. 8. The α-relaxation occurs at the peak of the tan(δ) as a function of temperature and is about 56±0.8° C. and about 55±3.7° C. for PA-11 and PA-610 homopolymers, respectively. The blends α-relaxation is about 55±3.6° C., about 56±3.3° C., and about 55±2.2° C. for the 75/25, 50/50, and 25/75 blends, respectively. The measured α-relaxation of all blends remain constant at about 55° C. compared to literature values of 47° C. for PA-11 and 52° C. for PA-610. There is only a single peak as a function of temperature which, like DSC, indicates a single glass transition temperature. However, the width of the tan(δ) peak is narrowest for the homopolymers and broadest for the 50/50 blend. Breadth of this peak can be associated with the molecular heterogeneity of the amorphous phase leading to additional supporting data for a miscible amorphous phase.

Figure 9:
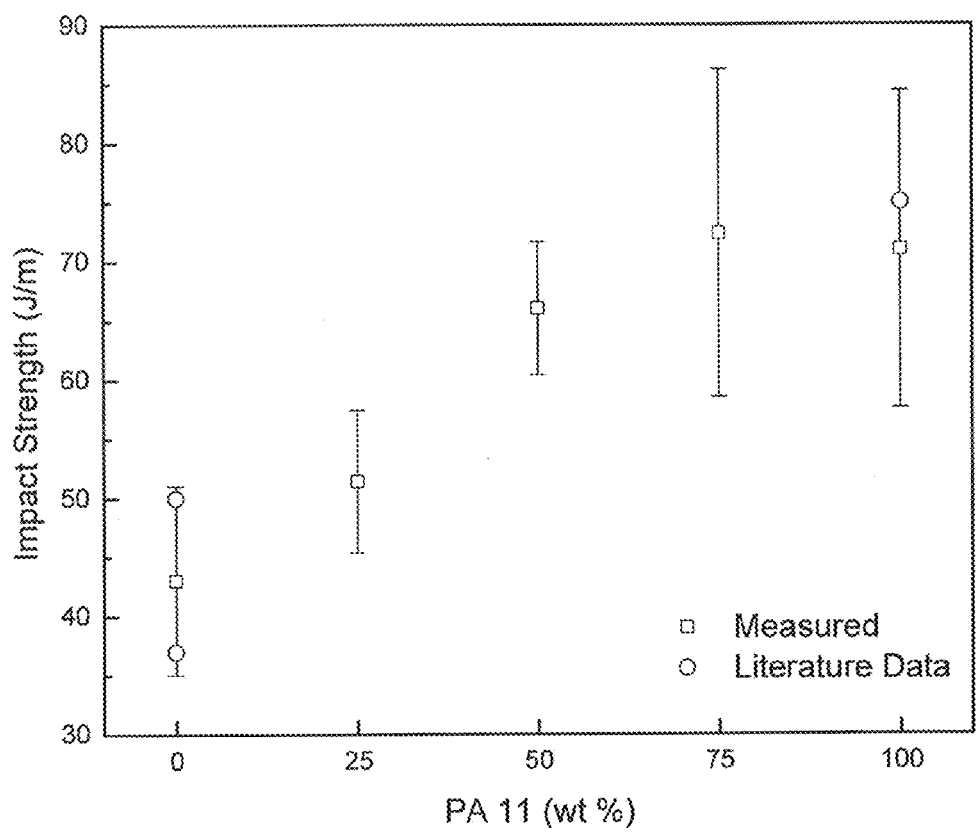
FIG. 9 illustrates measured impact strengths of blends without annealing and literature data for various blend samples.

FIG. 9 illustrates the measured impact strength of the blends, which ranges from about 40-75 J/m and shows positive deviation from a simple linear mixing rule between the two homopolymers. The homopolymers impact strengths are about 71±13 J/m and about 43±8 J/m for PA-11 and PA-610 homopolymer, respectively. The impact strengths of about 72±13 J/m, about 66±5 J/m, about 51±4 J/m correspond with the 75/25, 50/50, and 25/75 blends, respectively. The measured impact strength for both homopolymers is consistent with literature values.

Mechanical Testing

Procedures

Tensile Tests of injection molded bars were performed according to ASTM D638. Samples were allowed to densify after injection molding for about 24 hours before testing or thermal treatment. The thermal treatment sought to control the degree of crystallinity and was performed in a convection oven at the maximum crystallinity temperatures of the two homopolymers (first at about 185° C., second at about 162° C.) for about three hours each. The thickness and width are measured using an electronic caliper in three different places within the test region and averaged. A minimum of five samples for every composition was tested at about room temperature on a NTS InstruMET Corporation load frame using a 2000 lb load cell. The crosshead was used to measure strain, but corrected against extensometer data collected for small deformations. The correction factor took into account the observed difference in the crosshead strain and actual strain measured by extensometer. Error sited is one standard deviation.

Results

Figure 10:
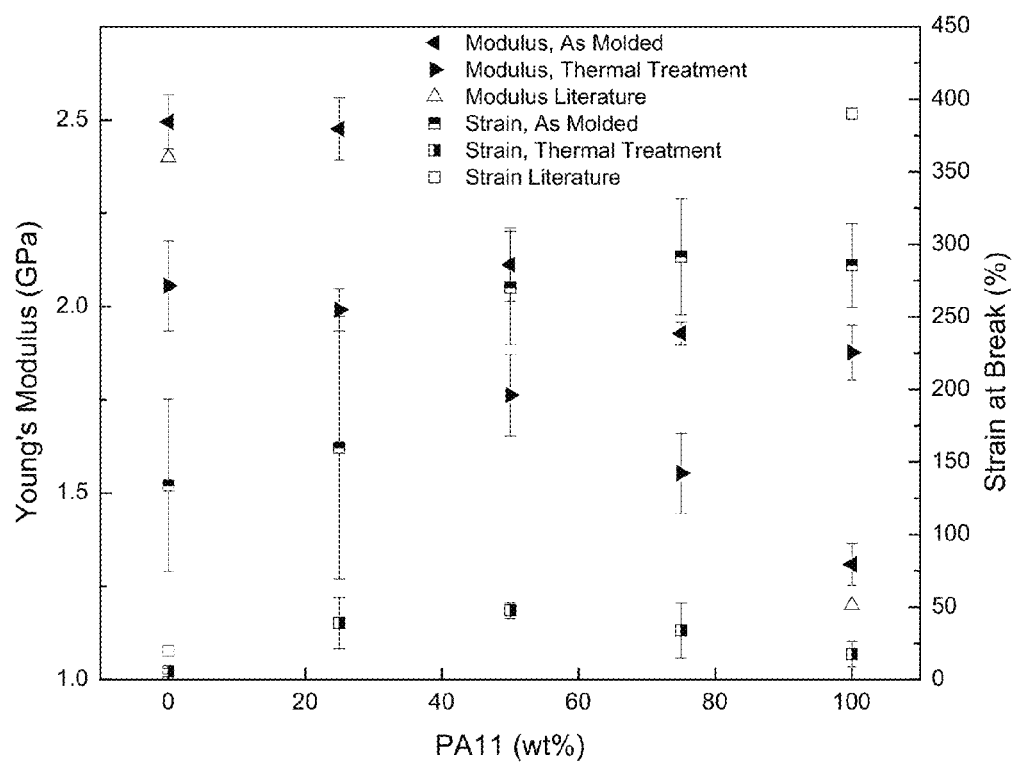
FIG. 10 illustrates the Young's modulus and strain at break measured for molded and thermally treated tensile bars.

Tensile testing was used to determine Young's Modulus (tensile modulus), strain at break, and tensile strength at yield. Young's Modulus was measured from about 1.3 to about 2.5 GPa for the molded samples and about 1.5 to about 2.0 GPa for the re-crystallized samples and are illustrated in FIG. 10. A crossover in modulus values occurs as the composition of PA-11 increases. In most cases, the as-molded samples have higher moduli but for the PA-11 homopolymer this is reversed. It is typical for the Young's Modulus to increase with increasing crystallinity. This was not observed for blends with a major component of PA-610. This difference is the result of annealing, which may increase void areas from where polymer chains have been incorporated into the crystal structure. This results from decreased chain mobility and increases the time required to densify the amorphous regions (procedure used 40 hours at room temperature). This would increase the stress on the fewer chains in the amorphous regions, leading to more stretching and a lower Young's moduli.

Strain at break was measured from about 133% to about 285% for as molded samples and about 6% to about 47% for thermally treated samples as illustrated in FIG. 10. Thermally treated samples have higher crystallinity and therefore the amorphous phase is prevented from flowing into the necking regions. This decreases the elongation ability of the polymer samples. The molded samples are observed to be slightly higher than monotonic increase between the two homopolymers. The thermally treated samples reach a maximum for the 50/50 blend.

Figure 11:
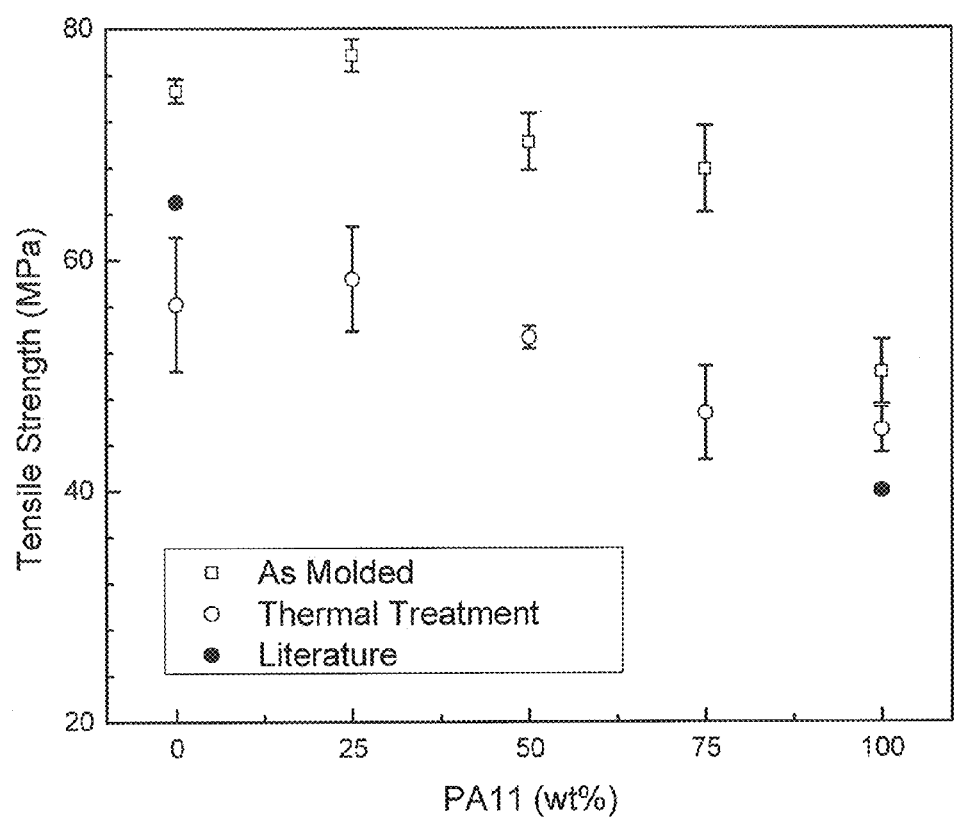
FIG. 11 illustrates the tensile strength at yield for various blend samples.
Figure 12:
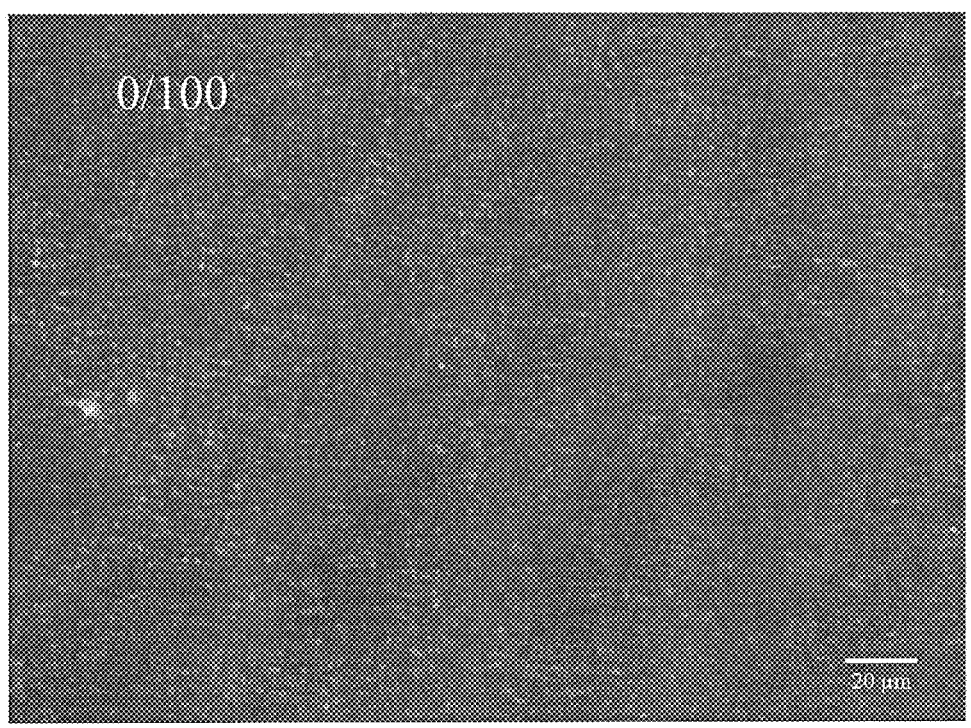
FIG. 12 illustrates a cross polarized microscopy image of PA-610 crystallized at about 185° C. then at about 162° C. depicting the size of spherulites in the sample.
Figure 13:
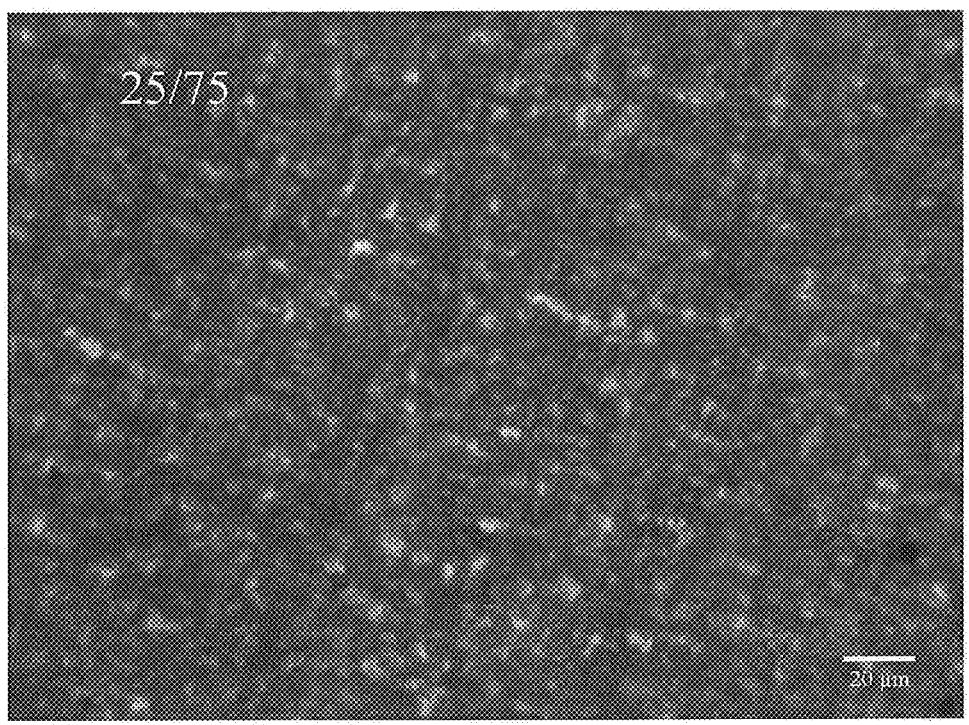
FIG. 13 illustrates a cross polarized microscopy image of 25/75 blend crystallized at about 185° C. then at about 162° C. depicting the size of spherulites in the sample.
Figure 14:
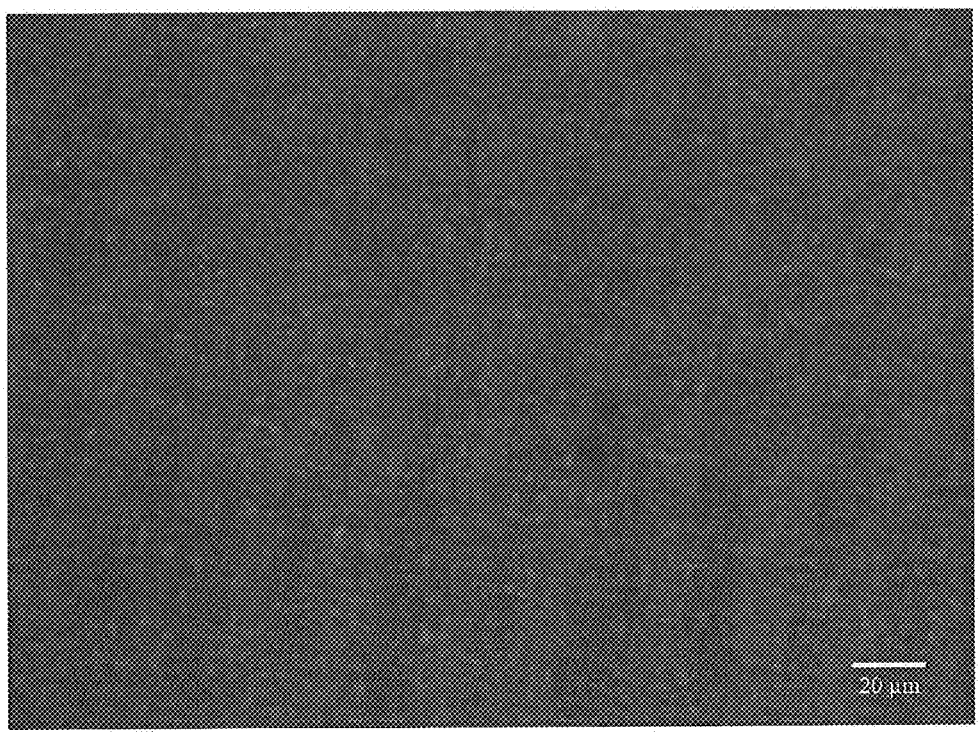
FIG. 14 illustrates a cross polarized microscopy image of 50/50 blend crystallized at about 185° C. then at about 162° C. depicting the size of spherulites in the sample.
Figure 15:
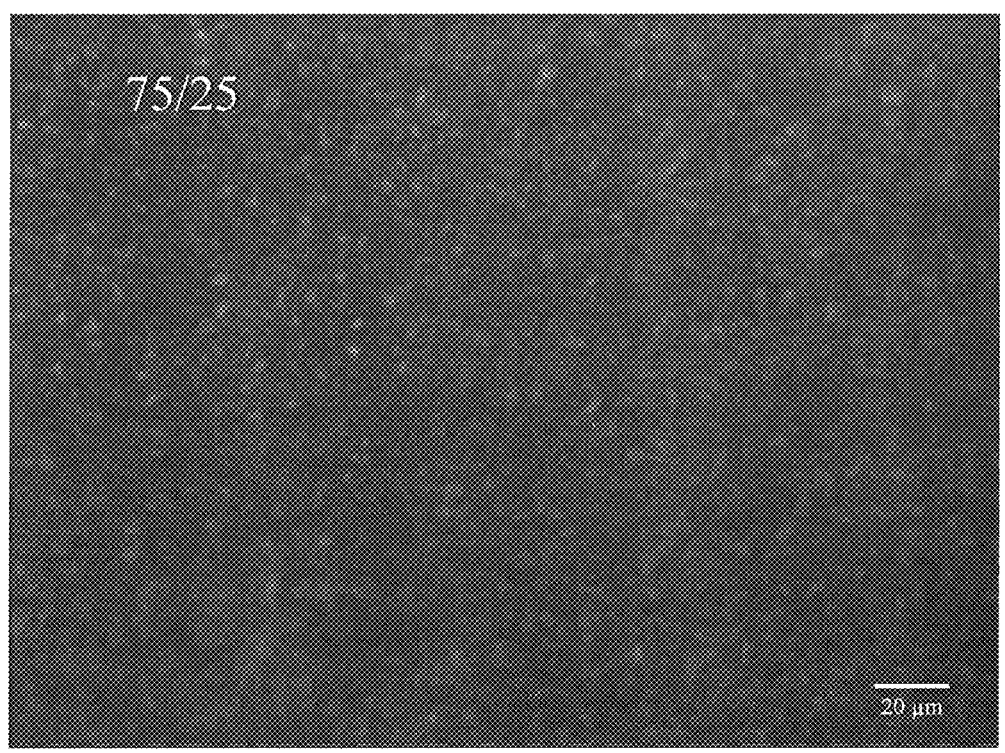
FIG. 15 illustrates a cross polarized microscopy image of 75/25 blend crystallized at about 185° C. then at about 162° C. depicting the size of spherulites in the sample.
Figure 16:
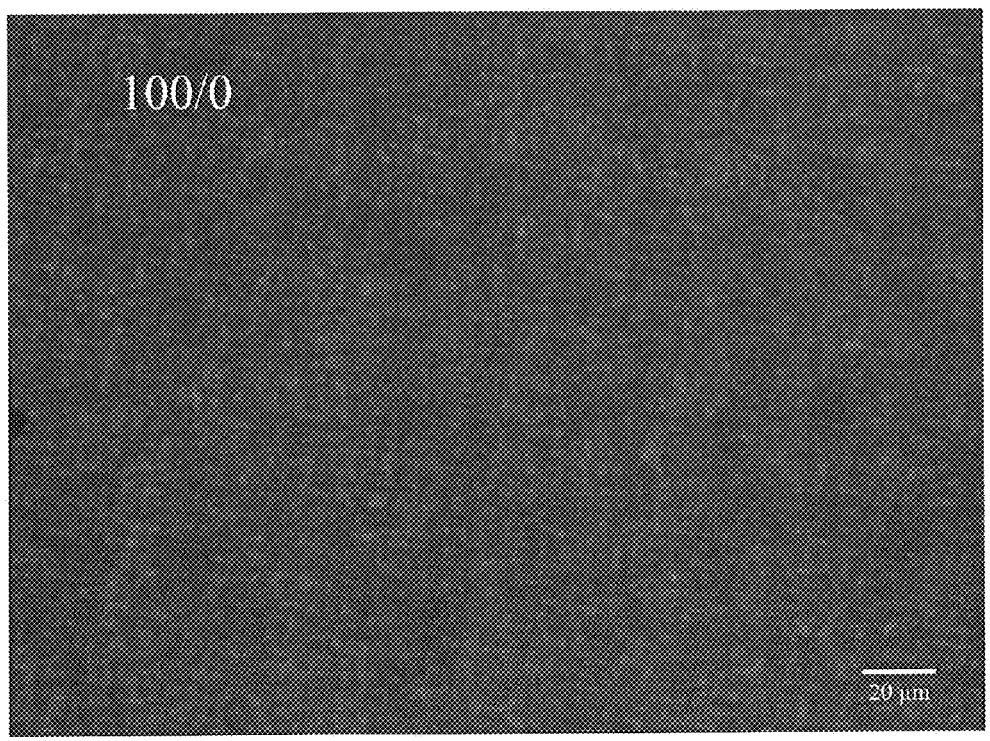
FIG. 16 illustrates a cross polarized microscopy image of PA-11 crystallized at about 185° C. then at about 162° C. depicting the size of spherulites in the sample.

Tensile strength at yield was measured from about 50-78 MPa for as molded samples and about 45-60 MPa for thermally treated samples with both showing a maximum for the 25/75 blend composition as illustrated in FIG. 11. It should be noted that the calculations are for engineering tensile strength at break. These ranges correspond with the approximate literature values found for PA-11 and PA-610.

Poisson's ratio was calculated using the shear modulus and the Young's modulus of crystallized samples and the results are shown in Table 9.

TABLE 9

| PA11/PA610 wt % | G (Complex Modulus) GPa | E (Young's Modulus) GPa | ν (Poisson's Ratio) |
|---|---|---|---|
| 100/0 | 0.83 | 1.88 | 0.13 |
| 75/25 | 0.85 | 1.55 | −0.08 |
| 50/50 | 0.97 | 1.76 | −0.10 |
| 25/75 | 1.04 | 1.99 | −0.04 |
| 0/100 | 1.17 | 2.06 | −0.12 |

Poisson's ratio for rigid polymers is typically between about 0.3-0.5 with about 0.5 being the maximum and a perfectly incompressible material. Literature has the Poisson's ratio of PA-11 and PA-610 within the range of about 0.3-0.4. The calculated Poisson's ratio of the blends shows a poor agreement between the shear modulus and Young's modulus. As the shear modulus was measured at room temperature with extra care to insure the samples were crystallized and dry, the Young's modulus for the thermally treated samples were under measured. This was likely the result of the correction factor changing with composition and crystallinity and possibly the water content within the polyamide samples. The Young's modulus would need to be about 15-50% higher in order for the calculated Poisson's ratio to agree with literature ranges.

Microscopy

Procedure

Microscopy was performed to determine the miscibility of the polymer blend and change in size of spherulites. Films were initially made through melt pressing between Teflon sheets using a Carver Press equipped with heated plates. Samples were quenched to about 0° C. by placing them between aluminum block through which ice water was flowing. Films were liberated from the Teflon and placed onto glass slides. Most of the films were then thermally treated using several annealing steps in different order to observe the differences in spherulite size. Pictures were taken using an Imaging Planet USB 2.0 3.3 MPX camera mounted on a Nikon microscope at 22× magnification.

Results

Samples were viewed under light microscopy in order to determine if separate domains were present in the melt phase (above both melting temperatures) and in the amorphous phase (below both melting temperatures). There was no observed difference, indicating miscibility. Calculations based on contribution method were performed to find approximate values for index of refraction in the two polymers as shown in Table 10.

TABLE 10

| | n (Refractive Index with Electromagnetism basis) | n (Refractive Index with Empirical basis) |
|---|---|---|
| Nylon 11 | 1.4812 | 1.4952 |
| Nylon 6,10 | 1.4816 | 1.4990 |

The wavelength used in the measurements was about 589 nm. The values indicate that there may not be a large enough difference in index of refraction to observe separate domains of the polyamide blends. The calculations were performed following both the electromagnetism and an empirical basis of calculations based on the contribution method. It was also found that the literature reports isotropic index of refraction as 1.52 for both homopolymers (an insufficient value to determine between phases).

Cross polarization was used on identically annealed polymer samples of different compositions to see the difference in the spherulitic size or shape in the blends. FIGS. 12-16 illustrate homopolymers and blends under cross polarized light microscopy at 22× magnification. It can be qualitatively observed that the size of the spherulites is slightly larger in the blends when compared to the homopolymers with the 25/75 blend being the largest.

Crystalline Structure
Procedure

Small angle x-ray scattering (SAXS) and wide angle x-ray scattering (WAXS) were performed to study changes in crystalline structure with blends and thermal annealing. Films were prepared through melt pressing on a Carver Press between Teflon sheets. Thermal treatment in a convection oven consisted of treating at about 185° C. or about 162° C. for about three hours on a preheated metal plate. The SAXS and WAXS tests were performed under vacuum on a Rigaku S-Max 3000 system using a wavelength of about 1.5405 Å calibrated with silver behenate. Data was collected on a multi wire photon detector (MPANT detector) for SAXS and reusable image plates for WAXS and analyzed using SAXS Gui V2.05.02 software. All SAXS samples were run for about 3 hours and all WAXS samples were run for 90 minutes.

Results

Figure 17:
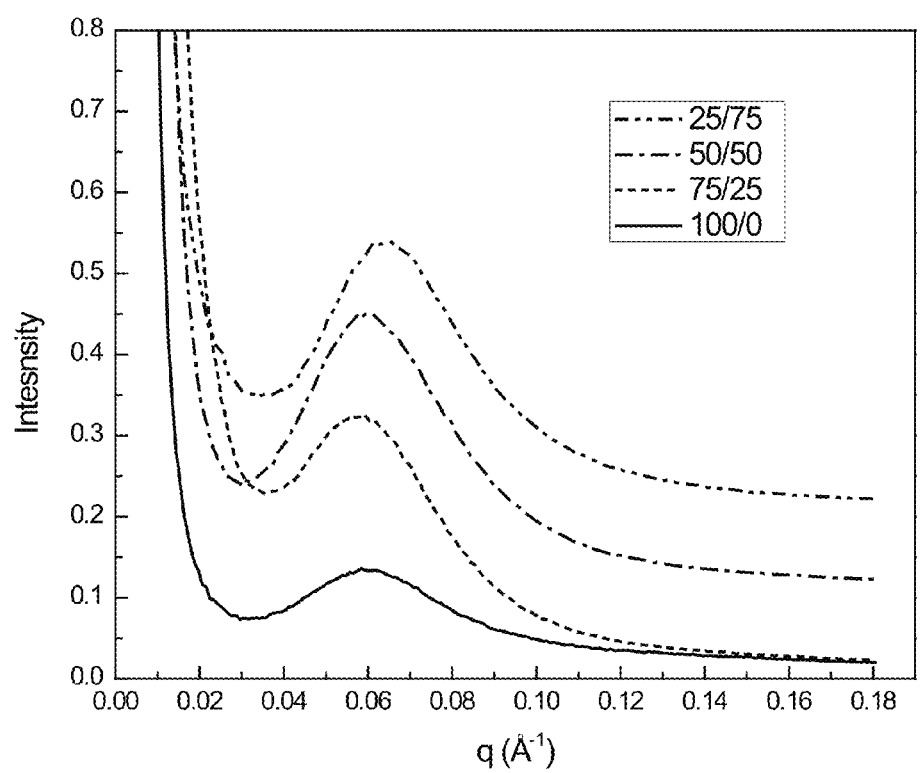
FIG. 17 illustrates a 1-D SAXS scattering of various blend samples annealed at the crystallization temperature of about 162° C. showing no change between the various blend samples.
Figure 18:
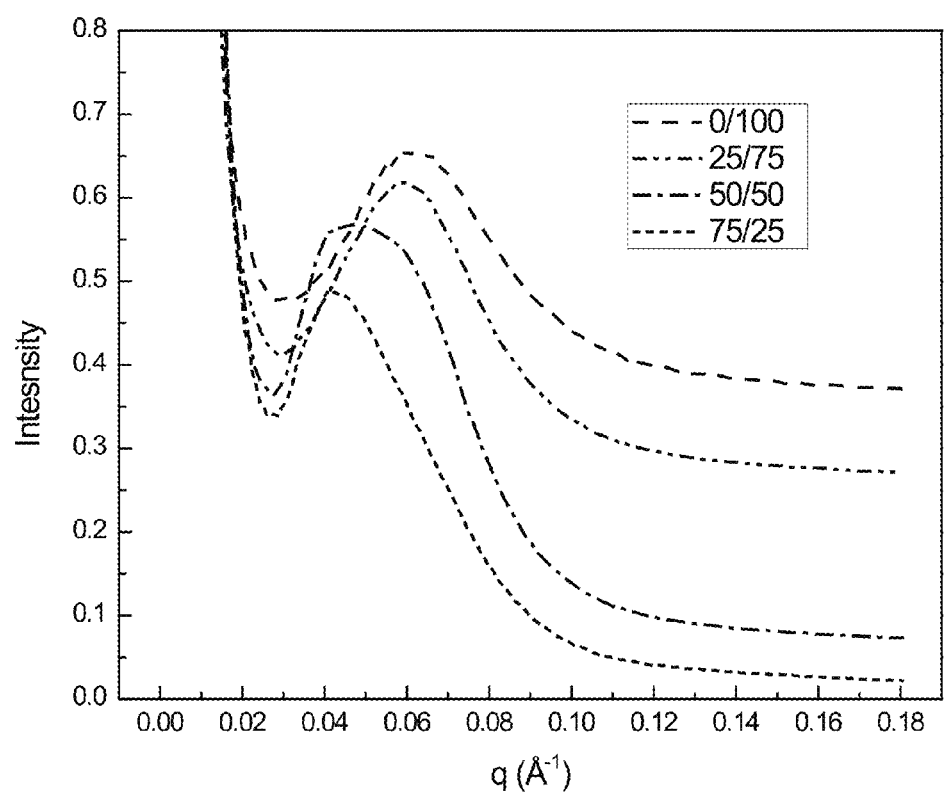
FIG. 18 illustrates a 1-D SAXS scattering of blends annealed at the crystallization temperature of about 185° C.

The size of the lamellar long spacing as a function of blend composition and annealing strategy were examined by SAXS. The polymers are not oriented in anyway, so the diffraction pattern is isotropic around the center of the beam block. There were two sets of data collected, one crystallized only at about 162° C. as seen in FIG. 17 and the other crystallized only at about 185° C. as seen in FIG. 18, corresponding with maximum crystallization temperature of PA-11 and PA-610, respectively, in the 50/50 blend. The lamellar long spacing is shown in Table 11.

TABLE 11

| | Long Spacing (Å) | |
|---|---|---|
| PA11/PA6,10 wt % | Crystallization Temperature = 162° C. | Crystallization Temperature = 185° C. |
| 100/0 | 90 | — |
| 75/25 | 90 | 99 |
| 50/50 | 88 | 94 |
| 25/75 | 88 | 90 |
| 0/100 | — | 86 |

For the samples crystallized at the PA-11 maximum crystallinity temperature, it can be seen that the long spacing of the lamellar structure decreases slightly from the homopolymer. This is due to the bulk averaging limitations of SAXS. The decrease can be explained by a weighted average of the two homopolymer long spacing. The lamellar long spacing for samples crystallized at the PA-610 maximum crystallization temperature increases as more PA-11 is added to the system. The decreasing scatter intensity (q) correlates with increasing long spacing and suggests PA-11 chains are "trapped" as the PA-610 crystal structures grow.

In the PA-610 sample, lamellar is forming. As a result, the long spacing, which includes lamellar and inter-lamellar amorphous regions, gets larger due to the increase in the amorphous regions dimensions. This has been shown to occur for crystalline/amorphous polymer mixtures.

Figure 19:
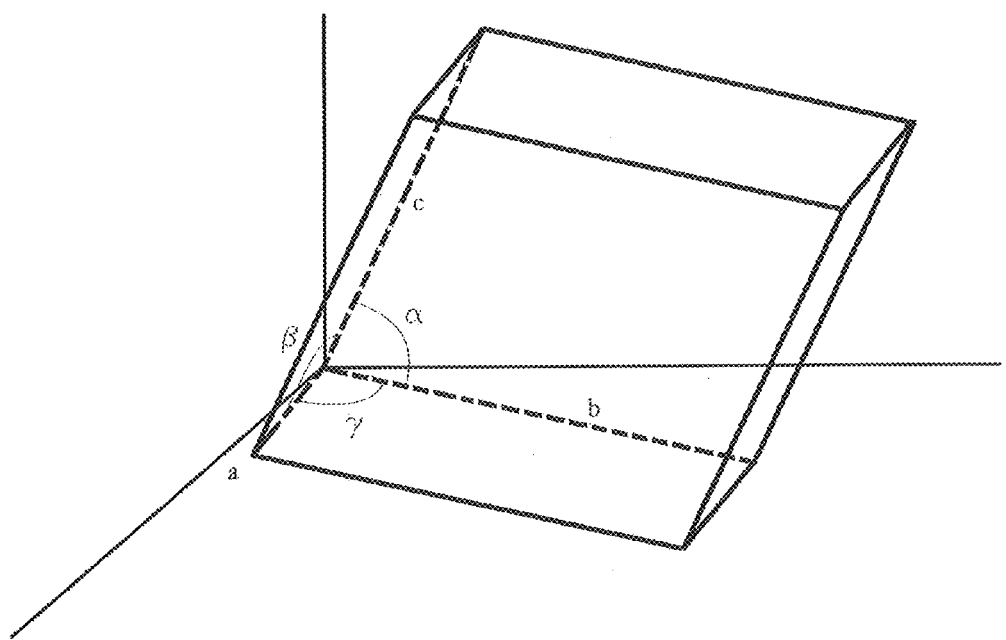
FIG. 19 illustrates a representative lattice structure for α-triclinic geometry.

The crystalline dimensions of the polyamide blends were examined as a function of blend composition and annealing strategy by WAXS. Literature reports PA-11 and PA-610 as having crystalline lattice structures of the α-triclinic shape which can be seen in FIG. 19. The representative lattice structure for α-triclinic geometry where a, b, and c are lattice dimensions and α, β, and γ lattice angles. The literature values for the lattice structures for PA-11 and PA-610 are given in Table 12 with the associated calculated and measured d-spacing that will be present for the crystals of PA-11 and PA-610.

TABLE 12

| | PA-11 | | | PA-610 | | |
|---|---|---|---|---|---|---|
| | Lattice Constants | Calculated d-spacing | Measured d-spacing | Lattice Constants | Calculated d-spacing | Measured d-spacing |
| a (Å) | 4.9 | 3.4 | 3.8 | 4.9 | 3.9 | 3.7 |
| b (Å) | 5.4 | 4.3 | 4.2 | 5.4 | 4.4 | 4.4 |
| c (Å) | 14.9 | 9.6 | 11.8 | 22.4 | 16.9 | 17.6 |
| α | 40° | | | 49° | | |
| β | 77° | | | 76.5° | | |
| γ | 63° | | | 63.5° | | |

There is correlation from the literature to the measured samples. The slight degree of systematic error is due to the long dimension (c) being along the polymer chain, which can easily stretch to a longer length and short dimensions (a and b) are pulled closer together as the c-dimension elongates.

Figure 20:
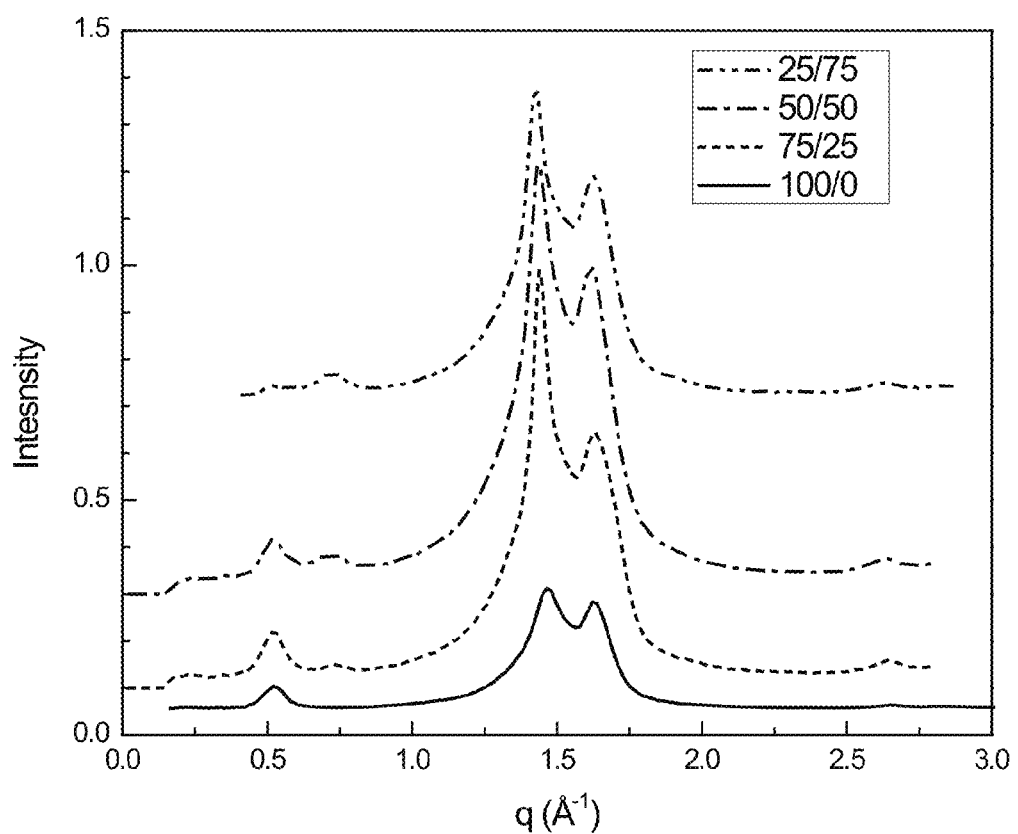
FIG. 20 illustrates a 1-D WAXS scattering of various blend samples annealed at the crystallization temperature of about 162° C.
Figure 21:
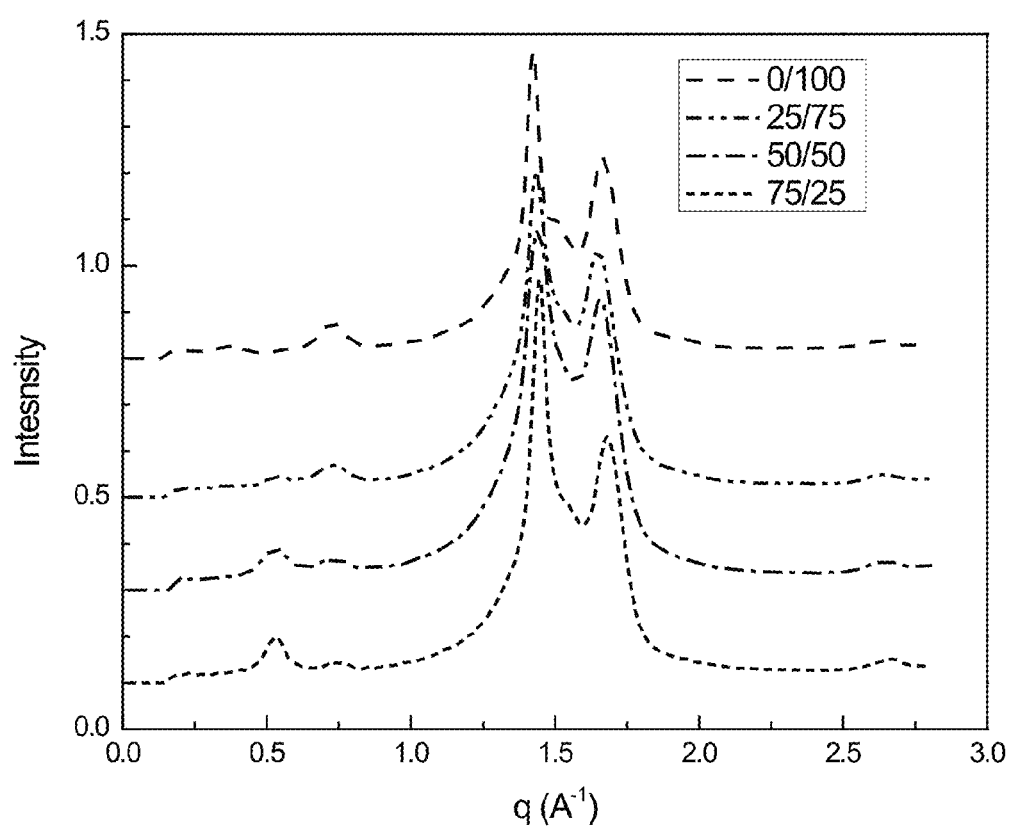
FIG. 21 illustrates a 1-D WAXS scattering of blends annealed at the crystallization temperature of about 185° C.

There were two sets of data collected, one crystallized only at about 162° C. illustrated in FIG. 20 and the other crystallized only at about 185° C. illustrated in FIG. 21, corresponding with maximum crystallization temperature of PA-11 and PA-610 respectively in the 50/50 blend. The measured crystalline dimensions are given in Table 13 for the samples crystallized at about 162° C. and Table 14 for the samples crystallized at about 185° C.

TABLE 13

| Associated Peak | 100/0 | 75/25 | 50/50 | 25/75 |
|---|---|---|---|---|
| $\kappa_c$ (Å) | 11.85 | 11.85 | 11.8 | 11.75 |
| $\lambda_{?1}$ (Å) | — | 8.435 | 8.578 | 8.583 |
| $\kappa_b - \lambda_b$ (Å) | 4.237 | 4.325 | 4.324 | 4.364 |
| $\lambda_{?2}$ (Å) | — | — | — | 4.07 |
| $\kappa_a - \lambda_a$ (Å) | 3.821 | 3.808 | 3.847 | 3.826 |
| $\lambda_{?3}$ (Å) | 2.354 | 2.363 | 2.37 | 2.381 |

TABLE 14

| Associated Peak | 75/25 | 50/50 | 25/75 | 0/100 |
| --- | --- | --- | --- | --- |
| $\lambda_c$ (Å) | — | — | — | 17.58 |
| $\kappa_c$ (Å) | 11.73 | 11.78 | 11.7 | — |
| $\lambda_{v1}$ (Å) | 8.39 | 8.53 | 8.568 | 8.531 |
| $\kappa_b - \lambda_b$ (Å) | 4.306 | 4.321 | 4.329 | 4.372 |
| $\lambda_{v2}$ (Å) | 4.026 | — | 4.094 | — |
| $\kappa_a - \lambda_a$ (Å) | 3.709 | 3.761 | 3.78 | 3.743 |
| $\lambda_{v3}$ (Å) | 2.347 | 2.357 | 2.364 | 2.37 |

The agreement for the peaks that are known to be associated with only one of the crystal structures are very consistent (i.e. $\kappa_c$) and those that are shared vary slightly as is expected. The $\kappa_b$-$\lambda_b$ peak changes monotonically based on the dimension of PA-11 to that of PA-610. WAXS is a bulk analysis tool, meaning that the measurement is an average of everything in the sample, therefore, when two peaks overlap closely the dimension being measured show a weighted average based on the number of instances of each crystal dimension. Qualitatively, the WAXS pattern appears to shift quite significantly toward the PA-610 crystal as the composition increases. This is evidence that the crystals are simultaneously crystallizing. The mechanism is most likely consistent with crystal phase induced separation.

This data shows consistent correlation to the PA-610 crystal dimensions. The $\lambda_c$ peak starts very small, and gets lost in noise even at the lowest composition of the PA11. Qualitatively, the WAXS pattern for the samples annealed at about 185° C. appears to remain consistent despite compositional changes. This is due to the melting temperature of the PA-11 being lower than the crystallization temperature. There are still PA-11 crystals present as PA-11 crystallizes quickly, however, the amount measured by WAXS is lower when compared to the same composition of the samples annealed at about 162° C.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method for producing a blended polyamide material, comprising:
   melting a polyamide 6, 10 to produce a melted polyamide 6, 10;
   adding a polyamide 11 to the melted polyamide 6, 10 to produce a melted polyamide mixture;
   adding at least one stabilization agent to the melted polyamide mixture to produce a melted stabilized polyamide mixture; and
   evaporating the at least one stabilization agent to produce the blended polyamide material, wherein the blended polyamide material is thermodynamically miscible.

2. The method of claim 1, wherein the blended polyamide material comprises between about 1 wt % to about 65 wt % of polyamide 6, 10.

3. The method of claim 1, wherein the blended polyamide material comprises between about 35 wt % to about 99 wt % of polyamide 11.

4. The method of claim 1, wherein at least a portion of the polyamide 6, 10 is renewable.

5. The method of claim 1, wherein the polyamide 11 is about 100% biorenewable.

6. The method of claim 1, wherein the blended polyamide material has a renewable carbon content between about 63% to about 100%.

7. The method of claim 1, wherein the at least one stabilization agent is selected from the group consisting of toluene, and m-cresol.

8. The method of claim 1, wherein the melting occurs at a melting temperature between about 200° C. and about 300° C.

9. The method of claim 1, wherein the melting occurs for 10 minutes.

10. The method of claim 1, further comprising preparing the polyamide 11 by vacuum drying at a pressure of between about 1 psi and about 15 psi, at a temperature between about 60° C. and about 100° C., for a duration of between about 12 hours to about 30 hours.

11. The method of claim 1, wherein between about 0.1 wt % and about 0.40 wt % of the at least one stabilization agent in the melted polyamide mixture is used.

12. The method of claim 1, further comprising cooling the blended polyamide material to about room temperature.

13. The method of claim 12, further comprising comminuting blended polyamide material into pellets.

14. A thermodynamically miscible, biorenewable polyamide blend with varying renewable carbon content, comprising:
   polyamide 11; and
   polyamide 6, 10.

15. The polyamide blend of claim 14, wherein storage moduli of the biorenewable polyamide blend is between about 1.9 GPA and about 2.5 GPA.

16. The polyamide blend of claim 14, wherein the impact strength of the biorenewable polyamide blend is between about 43 J/m and about 71 J/m.

17. A method of solution blending a blended polymer, comprising:
   mixing polyamide 11 and polyamide 6, 10 with a stabilizing agent to prepare a polymer solution; and
   drying the polymer solution to produce the blended polymer, wherein the blended polymer is thermodynamically miscible.

18. The method of claim 17, wherein the mixing occurs at a temperature between about 200° C. and about 300° C.

19. The method of claim 17, wherein the stabilizing agent is selected from the group consisting of toluene, and m-cresol.

20. The method of claim 17, wherein at least a portion of the polyamide 6, 10 is renewable.

* * * * *